(12) United States Patent
Hasegawa

(10) Patent No.: US 9,760,079 B2
(45) Date of Patent: Sep. 12, 2017

(54) CUTTING TOOL MACHINING METHOD AND A WIRE ELECTRIC DISCHARGE MACHINE

(71) Applicant: FANUC Corporation, Yamanashi (JP)

(72) Inventor: Yasuo Hasegawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 377 days.

(21) Appl. No.: 14/457,799

(22) Filed: Aug. 12, 2014

(65) Prior Publication Data

US 2015/0051727 A1    Feb. 19, 2015

(30) Foreign Application Priority Data

Aug. 16, 2013  (JP) ................................. 2013-169252

(51) Int. Cl.
| | | |
|---|---|---|
| *G06F 19/00* | (2011.01) | |
| *G05B 19/18* | (2006.01) | |
| *B23H 9/08* | (2006.01) | |
| *B23H 7/06* | (2006.01) | |
| *B23H 7/20* | (2006.01) | |

(52) U.S. Cl.
CPC .............. *G05B 19/182* (2013.01); *B23H 7/06* (2013.01); *B23H 7/20* (2013.01); *B23H 9/08* (2013.01); *B23H 2500/20* (2013.01); *G05B 2219/45043* (2013.01)

(58) Field of Classification Search
USPC ........................................................ 700/162
See application file for complete search history.

(56) References Cited

U.S. PATENT DOCUMENTS

| 2002/0183888 A1* | 12/2002 | Sasaki ..................... B23B 13/02 700/159 |
|---|---|---|
| 2007/0082580 A1 | 4/2007 | Simakov et al. |
| 2008/0022818 A1 | 1/2008 | Hackh et al. |
| 2012/0174424 A1 | 7/2012 | Makiuchi et al. |
| 2013/0138241 A1 | 5/2013 | Arakawa et al. |
| 2013/0208286 A1* | 8/2013 | Kurahashi .......... B23Q 17/2409 356/601 |

(Continued)

FOREIGN PATENT DOCUMENTS

| CN | 101462188 B | 4/2011 |
|---|---|---|
| CN | 102218574 B | 2/2013 |
| DE | 10344293 A1 | 4/2005 |

(Continued)

OTHER PUBLICATIONS

Office Action in DE application No. 102014111402.7, dated Jun. 1, 2016.

(Continued)

*Primary Examiner* — Mohammad Ali
*Assistant Examiner* — Md Azad
(74) *Attorney, Agent, or Firm* — Hauptman Ham, LLP

(57) ABSTRACT

In a wire electric discharge machine that machines a blade section of a cutting tool, in a state in which a rod-shaped reference jig is fixed to a rotary axis, a position on an outer circumferential surface of the reference jig is measured at each rotation position and stored. A rotational run-out error is calculated based on the stored rotational run-out position information, and a machining program is corrected to cancel the rotational run-out error.

4 Claims, 27 Drawing Sheets

(56) References Cited

U.S. PATENT DOCUMENTS

2013/0211577 A1* 8/2013 Yamane ................ B23H 7/065
        700/186
2014/0103014 A1* 4/2014 Arakawa ................ B23H 7/04
        219/69.12

FOREIGN PATENT DOCUMENTS

| DE | 102006035164 A1 | 1/2008 |
|----|-----------------|--------|
| JP | 55-5254 A | 1/1980 |
| JP | 56-33247 A | 4/1981 |
| JP | 8-171407 A | 7/1996 |
| JP | 2005-335018 A | 12/2005 |
| JP | 2012-91281 A | 5/2012 |
| JP | 2012-143830 A | 8/2012 |
| JP | 2013-111691 A | 6/2013 |

OTHER PUBLICATIONS

Office Action mailed Jan. 6, 2015, corresponding to Japanese patent application No. 2013-169252.

* cited by examiner

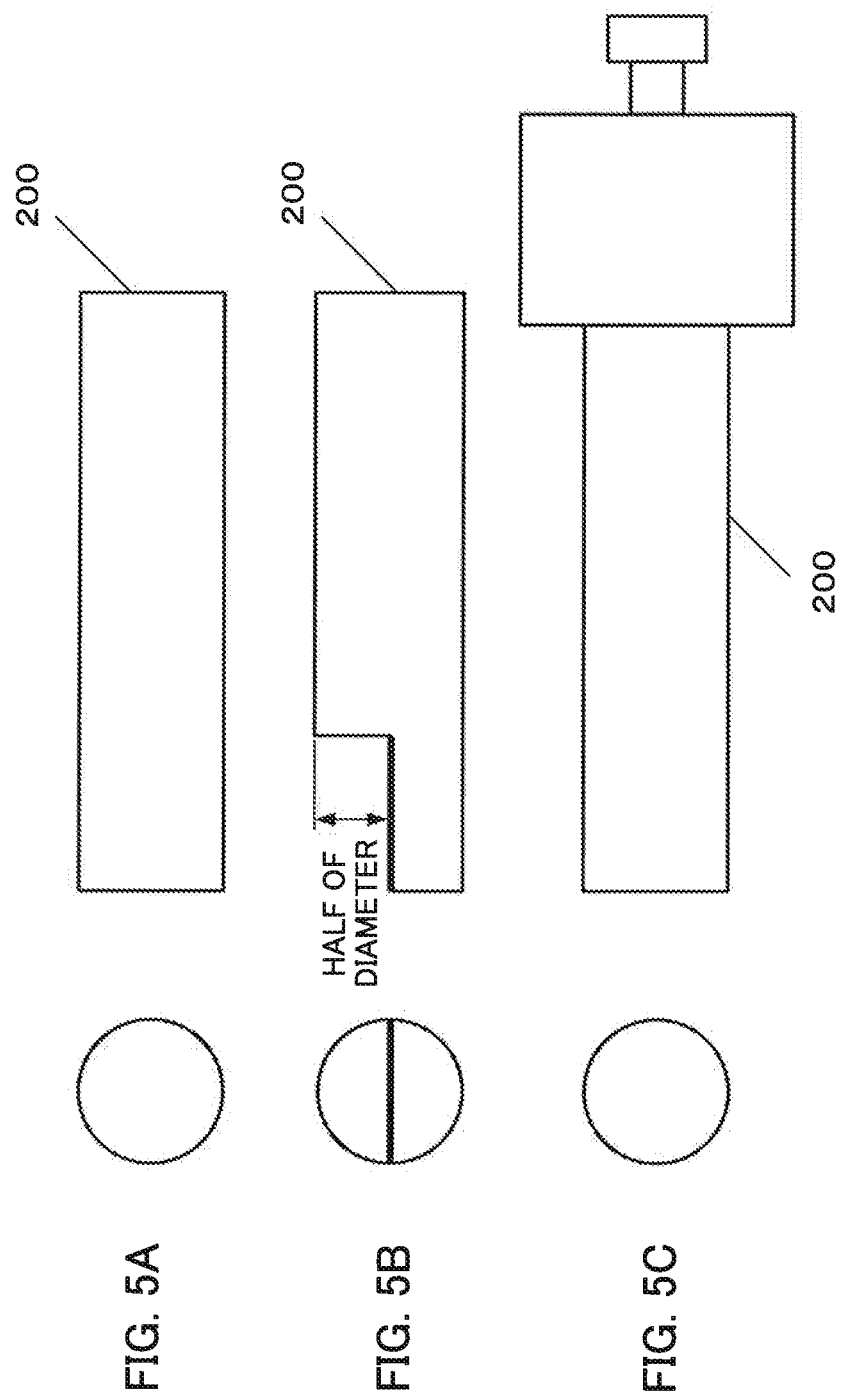

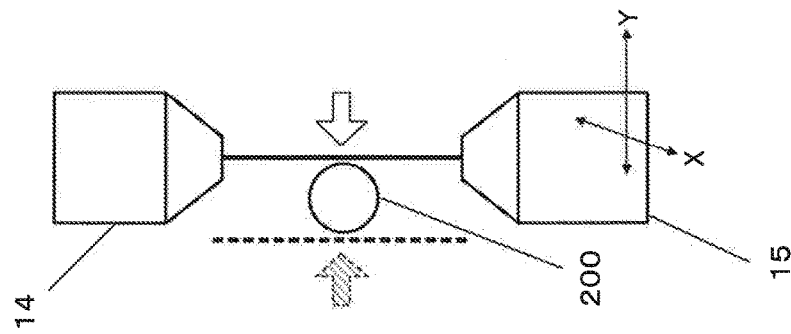
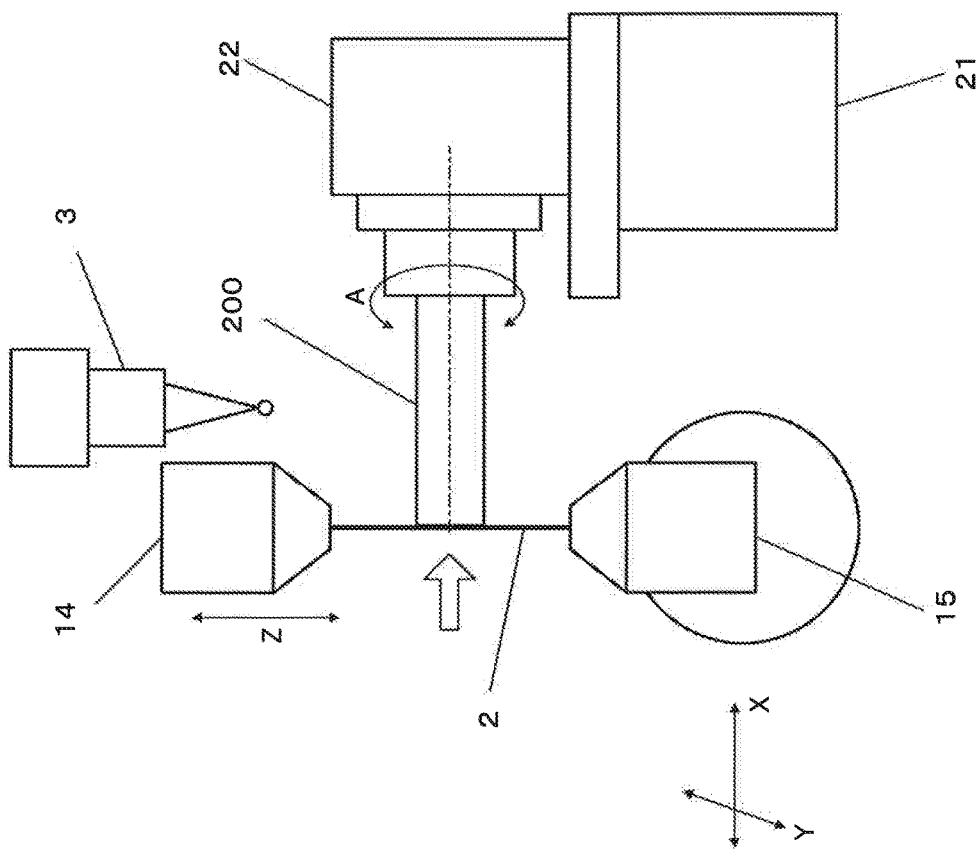
FIG. 6A
FIG. 6B

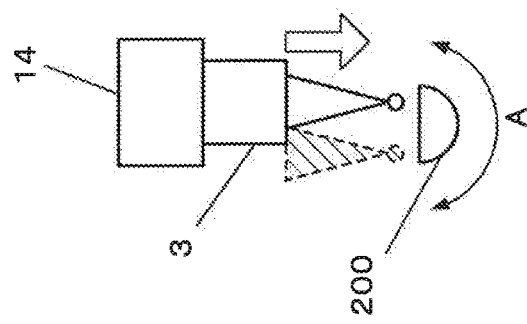
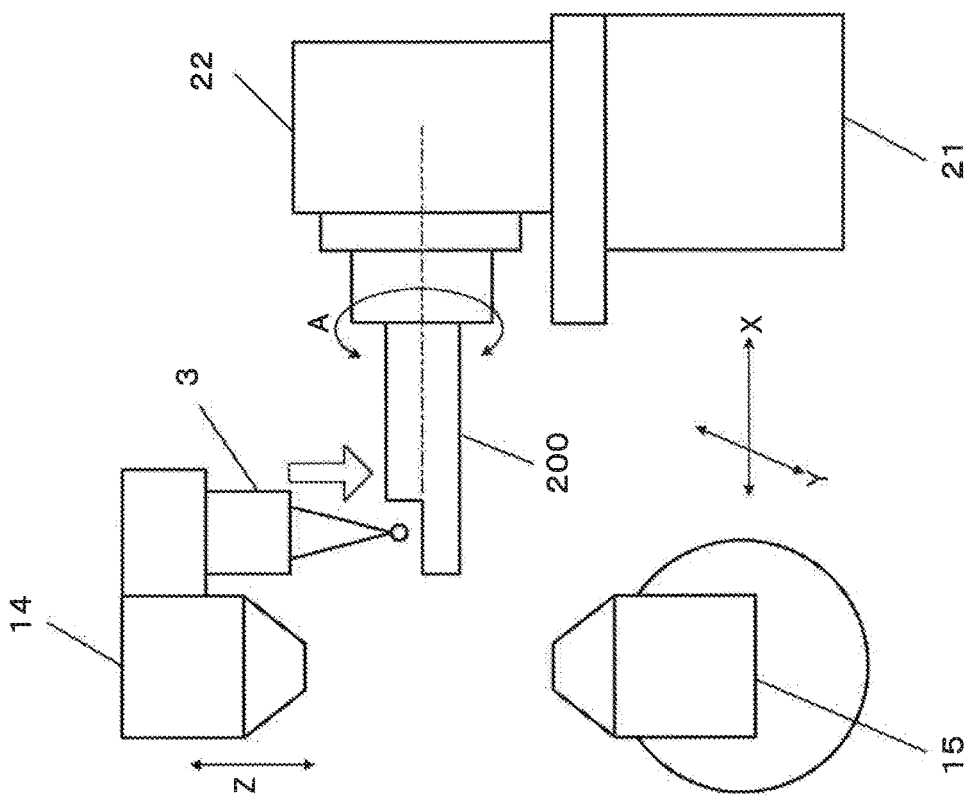

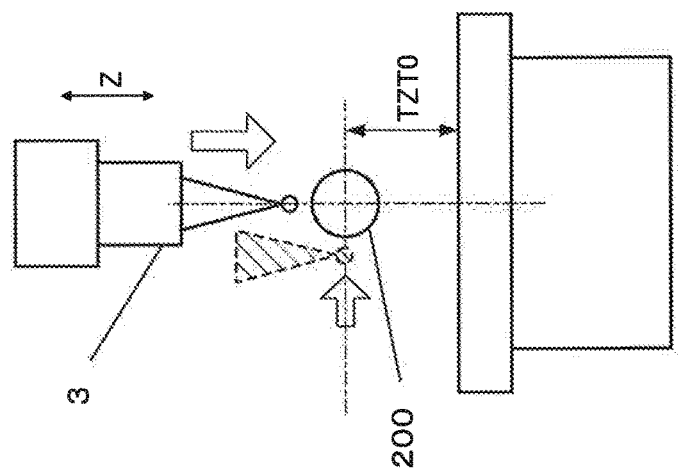
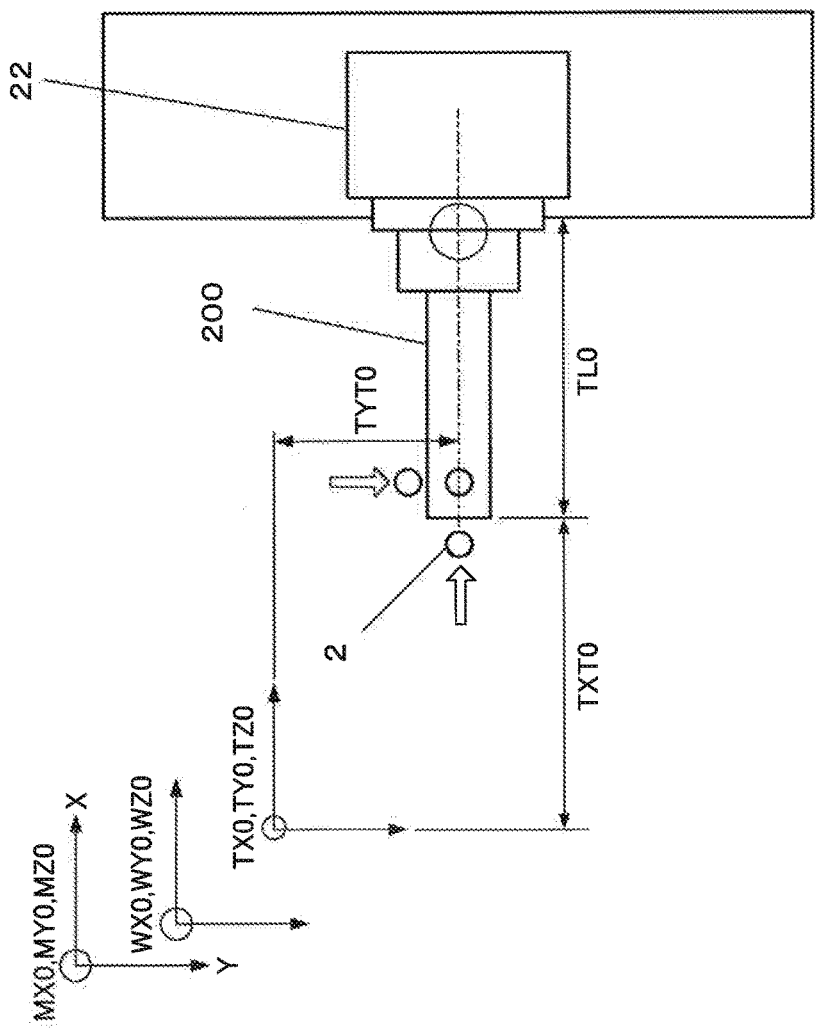
FIG. 10A
FIG. 10B

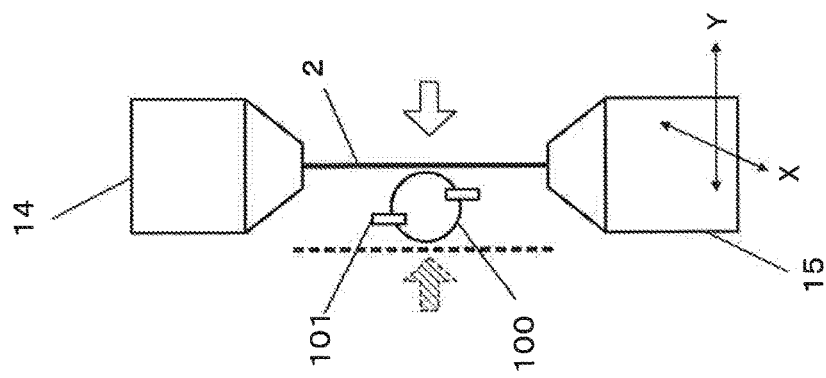
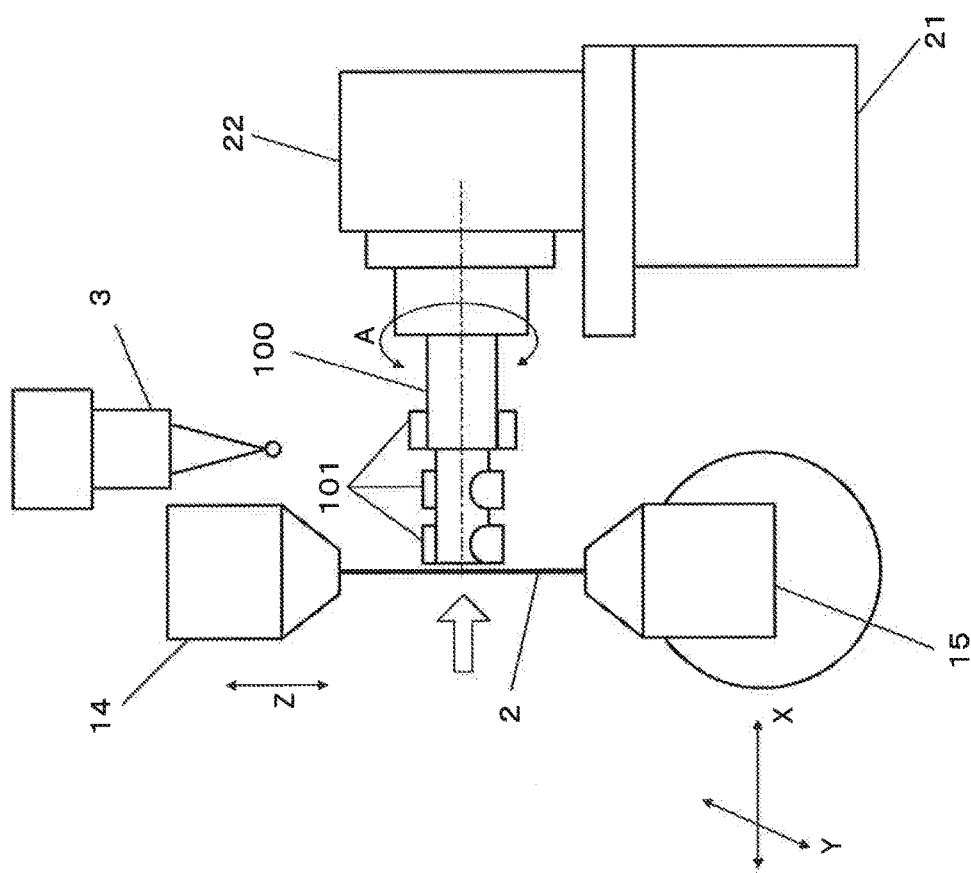

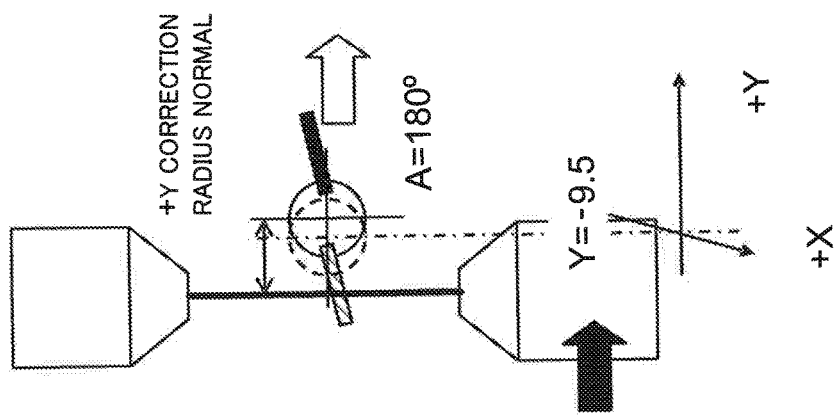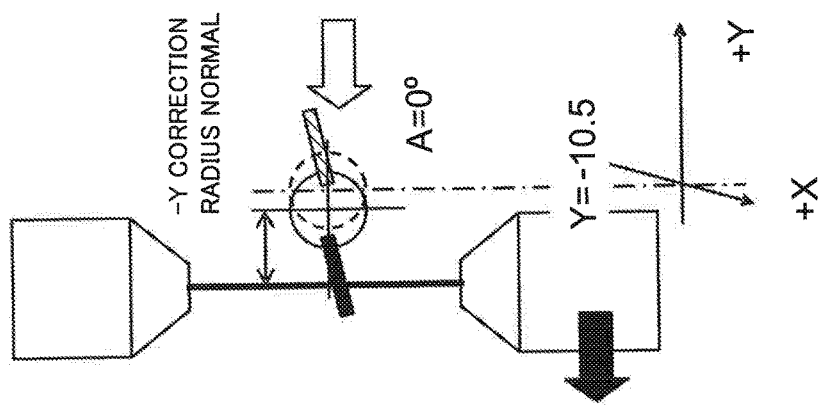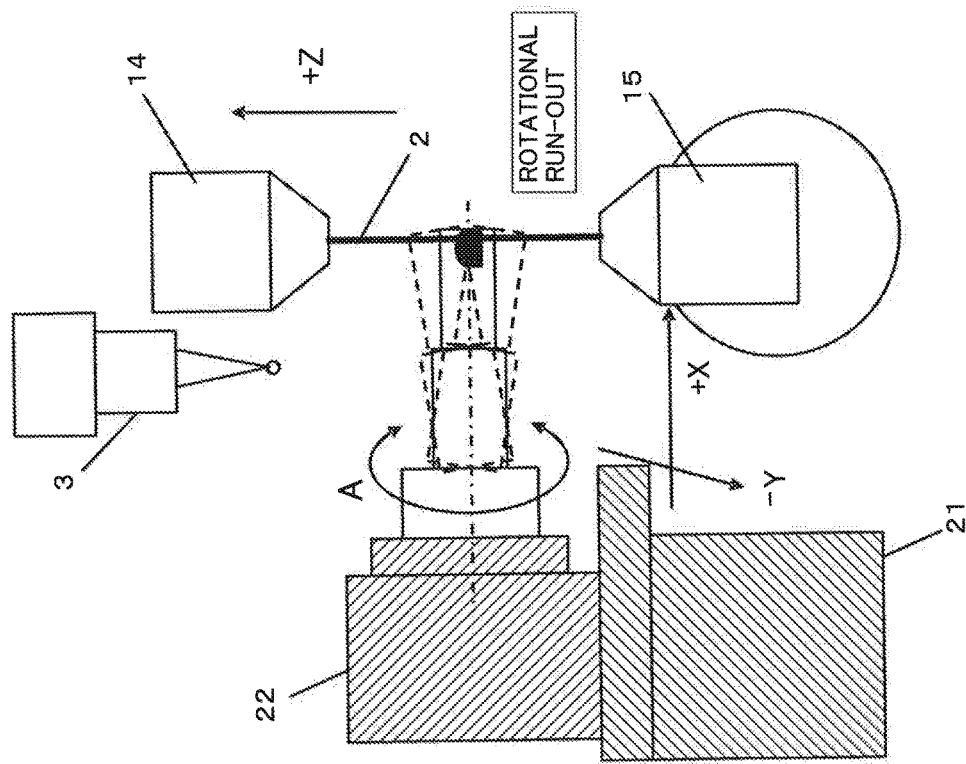

| ROTATIONAL COORDINATES A | ERROR MEASUREMENT |
|---|---|
| 0 | 0.020 |
| 10 | 0.018 |
| 20 | 0.016 |
| ~ | ~ |
| 180 | −0.020 |
| ~ | ~ |
| 330 | 0.013 |
| 340 | 0.016 |
| 350 | 0.018 |

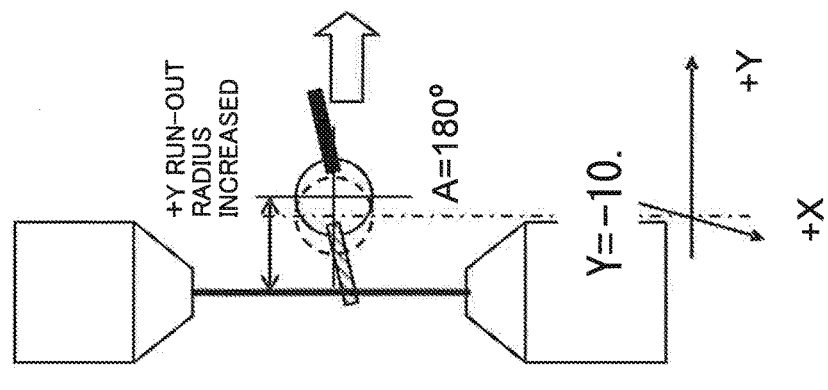
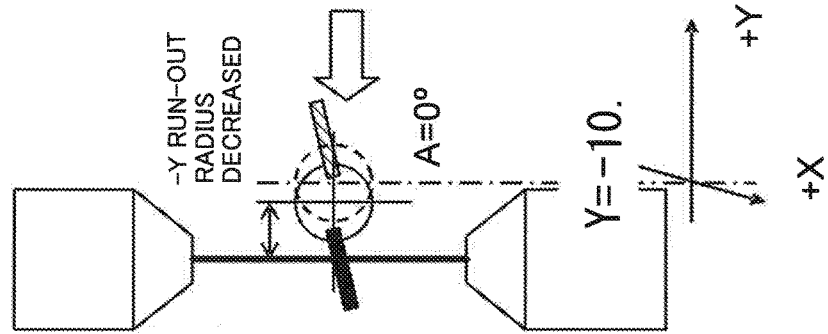
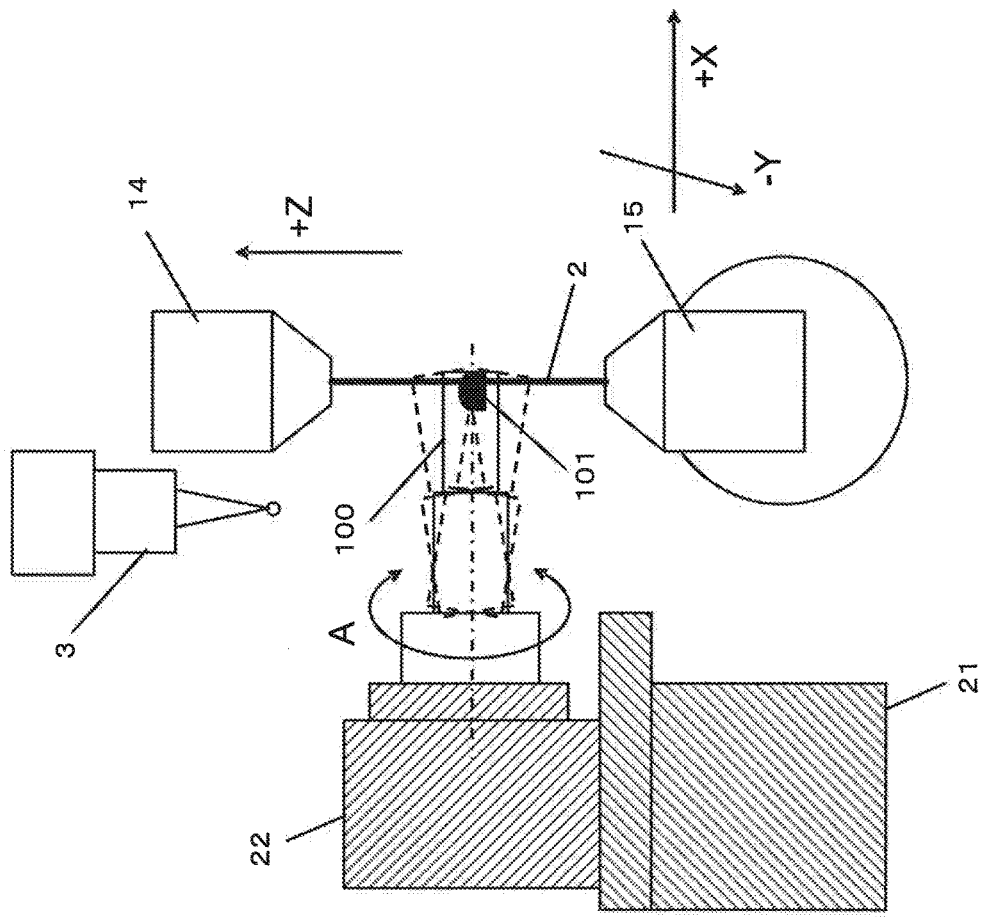

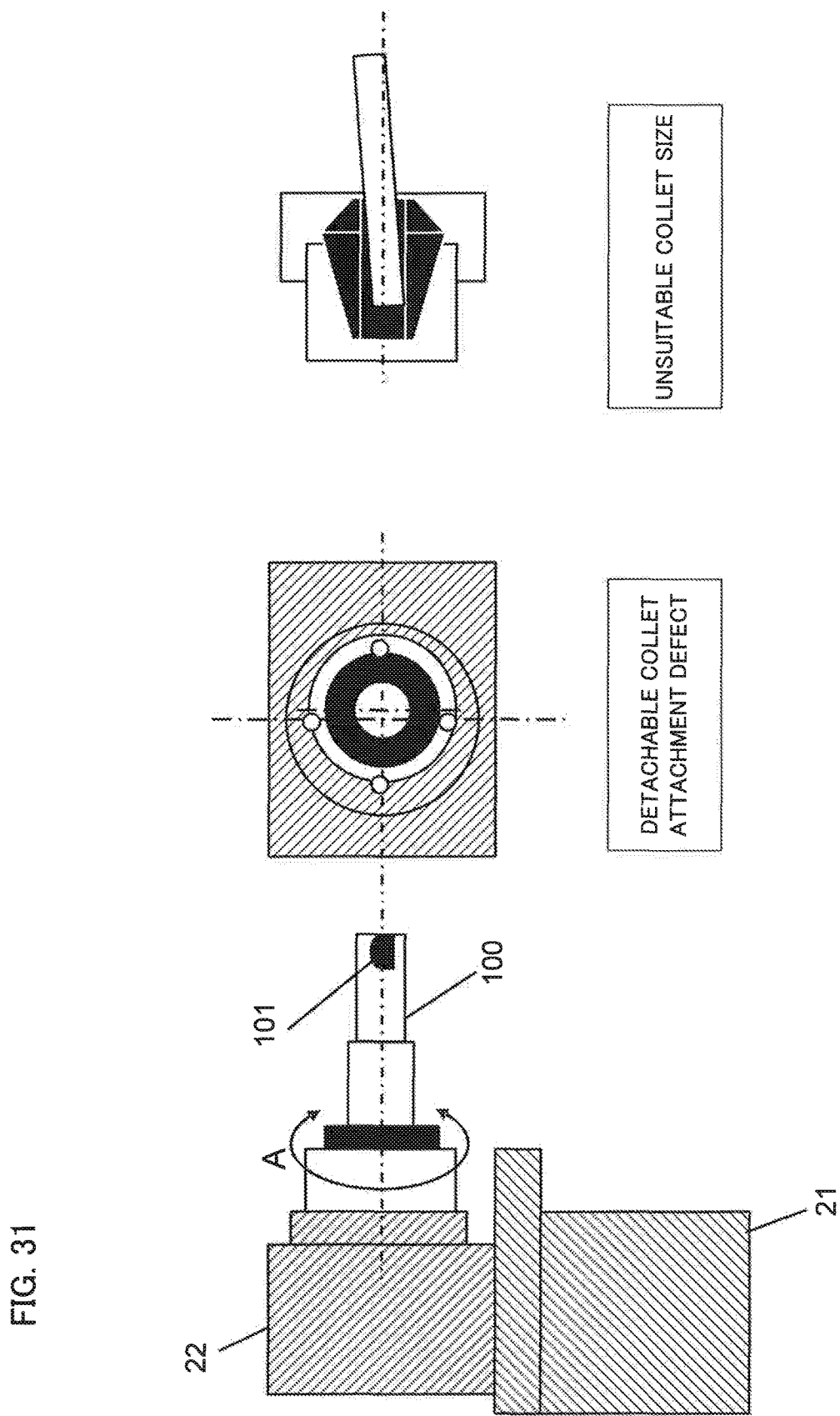

CUTTING TOOL MACHINING METHOD AND A WIRE ELECTRIC DISCHARGE MACHINE

RELATED APPLICATIONS

The present application claims priority to Japanese Application Number 2013-169252, filed Aug. 16, 2013, the disclosure of which is hereby incorporated by reference herein in its entirety.

BACKGROUND OF THE INVENTION

1. Field of the Invention

The present invention relates to a cutting tool machining method, and a wire electric discharge machine.

2. Description of the Related Art

Japanese Patent Application Laid-Open No. 2013-111691 discloses a wire electric discharge machining method for machining, with high precision, a rotating-type cutting tool to which a polycrystalline diamond (PCD) material or a polycrystalline cubic boron nitride (PCBN) material is attached as a cutting blade. The PCD material and the PCBN material are cutting-tool materials having the highest degree of hardness.

As shown in FIGS. 28A and 28B, in this wire electric discharge machining method, a rake face that becomes a PCD-material blade that is brazed to a PCD tool is measured in advance by a touch sensor fixed to an upper guide portion of a wire electric discharge machine. A machining program is created based on the measured measurement data, and wire electric machining is performed based on the machining program.

In the wire electric discharge machining method disclosed in Japanese Patent Application Laid-Open No. 2013-111691, when rotational run-out occurs during rotation positioning of the PCD tool attached to a rotary axis, a problem arises in that a run-out error occurs in the outer circumferential dimension of the machined cutting blade section. As shown in FIGS. 29A, 29B, and 29C, when cutting is performed by a rotation tool that has a rotational run-out error, machining defects, such as a dimensional error in product machining and machining vibrations caused by the run-out, occur. Product precision is thus adversely affected.

As shown in FIG. 30, conventionally, a rotation tool is attached to a three-jaw chuck or a four-jaw chuck that is attached to a rotary axis. The chuck position is adjusted so that rotational run-out accuracy is maintained within acceptable limits when the rotation tool is rotated around the rotary axis. In addition, as shown in FIG. 31, when the rotation tool is fixed to a detachable collet-type holder capable of reproducing the position for attachment and removal to and from a face plate of the rotary axis, the position of a fixing jig for attachment and removal that attaches the collet holder to the rotary axis is required to be adjusted in advance so that the collet holder is accurately attached at the center of rotation.

In a high-precision rotation tool, the acceptable value for rotational run-out accuracy of the rotation tool is ordinarily 0.010 mm or less. Taking into account machining errors that occur during production of the rotation tool, the rotational run-out that occurs during rotation by the rotary axis is required to be kept within the acceptable limits. Such position adjustment requires expert adjustment techniques and a large amount of man-hours. In particular, when the three-jaw chuck or the four-jaw chuck, which are less expensive than the detachable collet holder, is used, the rotational run-out adjustment operation is required to be performed every time a tool is exchanged, and a large amount of man-hours is required. When the collet holder is used, because only a tool having an outer diameter that is compatible with the inner diameter of the collet can be attached, a large number of expensive collets are required to be provided to support various tool outer diameters.

Even in the case of the detachable collet holder in which position adjustment at the center of rotation is performed in advance, it is difficult to fix the tool exactly at the center of the collet because of tolerances in the collet inner diameter and the tool outer diameter. However slight, misalignment from the center and tilting occurs, thereby causing positional misalignment during production of the rotation tool and leading to a rotational run-out error.

In addition, in a centering apparatus and a centering method disclosed in Japanese Patent Application Laid-Open No. 2012-143830, the outer circumference of a rotation body is measured at two points in a +X direction and a −Y direction, and a position $\alpha$ of a center point between the two points is then calculated. In addition, the same outer circumference is measured at two points in a +Y direction and a −Y direction, and a position $\beta$ of a center point between the two points is then calculated. $\alpha$ and $\beta$ indicate the positionally misaligned centers of the rotation body. A misalignment amount R is then me rely calculated by $\sqrt{(\alpha 2+\beta 2)}$. This method cannot be applied to a wire electric discharge machine in which a wire electrode is stretched in an up/down direction and only the Y-direction position coordinate of a contact point on the outermost circumference of a tool can be obtained.

In addition, in Japanese Patent Application Laid-Open No. 8-171407, the circumference of the rotational run-out is measured by a proximity sensor. The run-out error is fitted by a sine curve, and a machining point is corrected based on the sine curve fitting. In this method, because the center of the rotational run-out and the maximum run-out width are not derived by calculation, all positions on the circumference are required to be measured by the proximity sensor. Therefore, correct measurement and correction are not possible for a tool, such as a cutting tool, that has three or four cutting blades and an incomplete cylindrical outer circumference in which a relief portion is formed as a notch in the tool outer circumference in a section in which the blade face is present.

SUMMARY OF THE INVENTION

Therefore, an object of the present invention is to provide a method for creating a high-precision rotation tool that has low rotational run-out, in which a position adjustment operation is omitted by correcting rotational run-out in a rotary axis or rotational run-out in a rotation tool fixed to the rotary axis when a machining program for machining a tool is created, and a wire electric discharge machine having the creating function.

A cutting tool machining method of the present invention includes measuring a position of a blade face in a cutting tool attached to a rotary axis by a touch sensor or a non-contact position detecting device, creating a machining program based on the measured position, and machining a blade section of the cutting tool by wire electric discharge. The cutting tool machining method comprises, fixing a rod-shaped reference bar to the rotary axis; performing rotation positioning in at least three rotation angle positions by the rotary axis; measuring a position in an outer circumferential section near a rotation center height in a direction approaching an outer circumferential surface of the reference bar for measurement at each rotation angle position using the touch sensor, the non-contact position detecting device, or a wire electrode, and storing the measured positions in a storage unit as rotational run-out position information for the rotation angle positions; calculating a center coordinate of rotational run-out, and a rotation coordinate and a run-out error of each rotation angle position based on the stored rotational run-out position information; and correcting the machining program or a machining path to cancel the rotational run-out error determined by the calculation, when the cutting tool is fixed to the rotary axis and machined.

A cutting tool machining method of the present invention includes measuring a position of a blade face in a cutting tool attached to a rotary axis by a touch sensor or a non-contact position detecting device, creating a machining program based on the measured position, and machining a blade section of the cutting tool by wire electric discharge. The cutting tool machining method comprises, fixing the cutting tool to the rotary axis; performing rotation positioning in at least three rotation angle positions by the rotary axis; measuring a position in an outer circumferential section near a rotation center height in a direction approaching a cylindrical outer circumferential section of the cutting tool for measurement at each rotation angle position using the touch sensor, the non-contact position detecting device, or a wire electrode, and storing the measured positions in a storage unit as rotational run-out position information; calculating a center coordinate of rotational run-out, and a rotation coordinate and a run-out error of each rotation angle position based on the stored rotational run-out position information; and correcting the machining program or a machining path to cancel the rotational run-out error determined by the calculation, when the cutting tool is machined.

The method may further include, detecting an upper end surface position of the outer circumferential section, from an upper position of the reference bar or the cutting tool at the center of rotation in a direction approaching the outer circumferential section towards the lower side, instead of the position in the outer circumferential section near the rotation center height, when the outer circumferential section of the reference bar or the cylindrical outer circumferential section of the cutting tool is measured using the touch sensor or the non-contact position detecting device.

A wire electric discharge machine of the present invention is a wire electric discharge machine for measuring a position of a blade face in a cutting tool attached to a rotary axis by a touch sensor or a non-contact position detecting device, for creating a machining program based on the measured position, and for machining a blade section of the cutting tool. The wire electric discharge machine includes: a storage unit configured to store, as rotational run-out position information for at least three rotation angle positions, positions in an outer circumferential section near a rotation center height, measured in a direction approaching an outer circumferential surface of the reference bar for measurement is measured at each rotation angle position by the touch sensor, the non-contact position detecting device, or a wire electrode, in a state where a rod-shaped reference bar is fixed to the rotary axis; a run-out error calculating unit configured to calculate a center coordinate of rotational run-out, and a rotation coordinate and a run-out error of each rotation angle position based on the stored rotational run-out position information; and a program correcting unit or a machining path correcting unit configured to correct the machining program or a machining path to cancel the rotational run-out error determined by the calculation when the cutting tool is fixed to the rotary axis and machined.

A wire electric discharge machine of the present invention is a wire electric discharge machine for measuring a position of a blade face in a cutting tool attached to a rotary axis by a touch sensor or a non-contact position detecting device, for creating a machining program based on the measured position, and for machining a blade section of the cutting tool. The wire electric discharge machine includes: a storage unit configured to store, as rotational run-out position information for at least three rotation angle positions, positions in an outer circumferential section near a rotation center height measured in a direction approaching a cylindrical outer circumferential section of the cutting tool for measurement at each rotation angle position by the touch sensor, the non-contact position detecting device, or a wire electrode, in a state where the cutting tool I fixed to the rotary axis; a run-out error calculating unit configured to calculate a center coordinate of rotational run-out, and a rotation coordinate and a run-out error of each rotation angle position based on the stored rotational run-out position information; and a program correcting unit or a machining path correcting unit configured to correct the machining program or a machining path to cancel the rotational run-out error determined by the calculation when the cutting tool is machined.

The wire electric discharge machine may include a unit configured to detect an upper end surface position of the outer circumferential section from an upper position of the reference bar or the cutting tool at the center of rotation in a direction approaching the outer circumferential section towards the lower side, instead of the position in the outer circumferential section near the rotation center height, when the outer circumferential section of the reference bar or the cylindrical outer circumferential section of the cutting tool is measured by the touch sensor or the non-contact position detecting device.

As a result of the above-described configurations being included, the present invention can provide a method for creating a high-precision rotation tool that has low rotational run-out, in which a position adjustment operation is omitted by correcting rotational run-out in a rotary axis or rotational run-out in the rotation tool fixed to the rotary axis when a machining program for machining a tool is created, and a wire electric discharge machine having the creating function. In addition, the present invention can provide a method for creating a high-precision rotation tool that has low rotational run-out, in which a position adjustment operation is omitted by correcting a machining path to correct rotational run-out based on a position coordinate of the rotary axis during positioning of a movement axis in a horizontal direction, and a wire electric discharge machine having the creating function.

In other words, adjustment man-hours for adjusting to maintain the rotational run-out within acceptable limits is not required and work hours can be significantly reduced. A high-precision rotation tool that has low rotational run-out can be easily created, even by a fixing method in which run-out occurs.

BRIEF DESCRIPTION OF THE DRAWINGS

The above and other objects and features of the present invention will be apparent from the following description of embodiments with reference to the appended drawings, in which:

FIGS. 5A, 5B and 5C are diagrams for explaining examples of a reference jig shape;

FIGS. 6A and 6B are diagrams for explaining a method for measuring a reference jig using a wire electrode;

FIGS. 8A and 8B are diagrams for explaining a method for measuring a horizontal surface of the reference jig using the touch sensor;

FIGS. 10A and 10B are diagrams for explaining the principle of reference jig measurement by the touch sensor;

FIGS. 12A and 12B are diagrams for explaining a method for measuring a tool fixing position using the wire electrode;

FIGS. 16A, 16B and 16C are diagrams for explaining high-precision tool machining by rotational run-out correction;

FIGS. 29A, 29B and 29C are diagrams for explaining tool-machining precision defect caused by rotational run-out;

FIG. 31 is a diagram for explaining positional misalignment between the center of rotation of a rotary axis and the center of a tool.

DETAILED DESCRIPTION OF THE PREFERRED EMBODIMENTS

Figure 1:
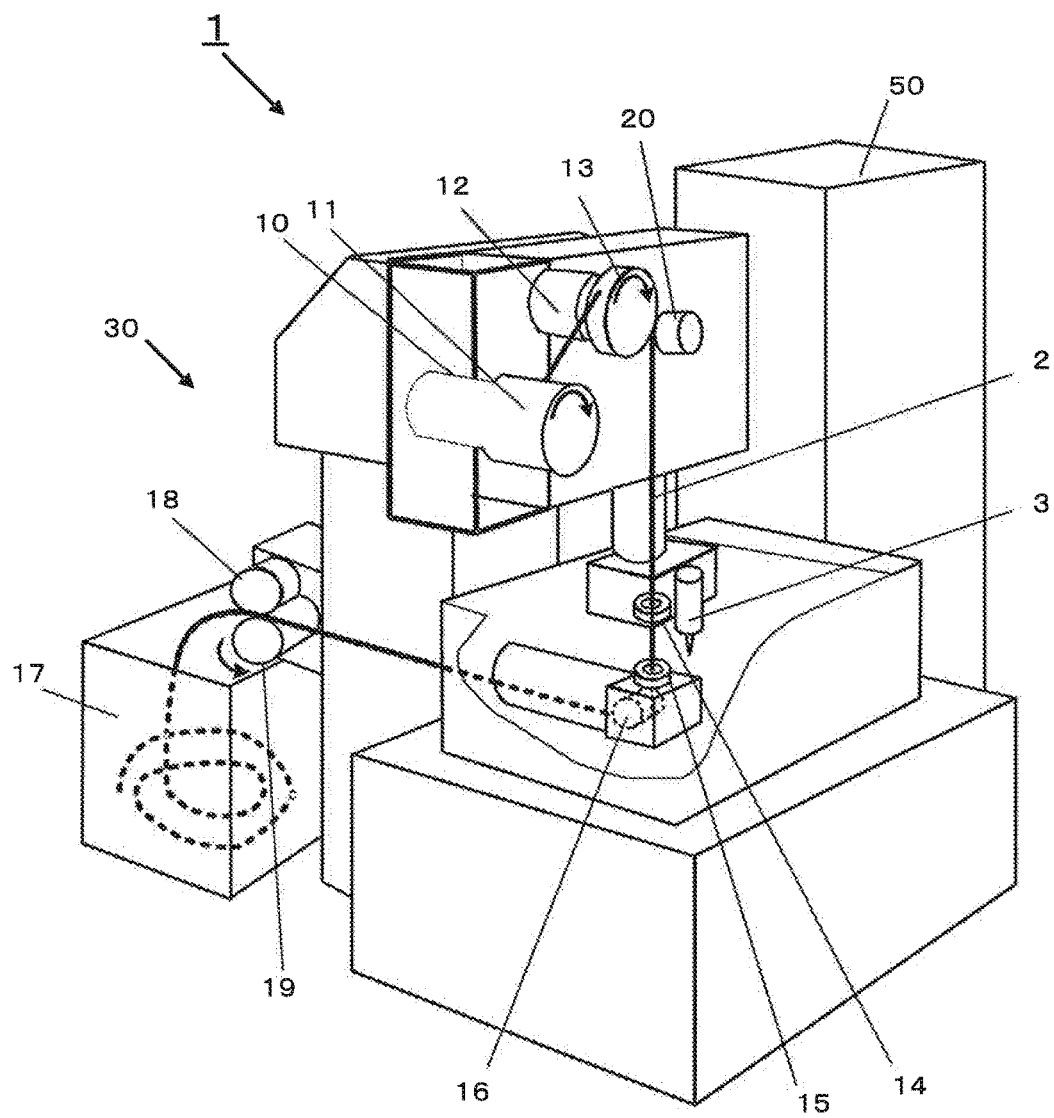
FIG. 1 is a diagram for explaining an overview of a wire electric discharge machine.
Figure 2:
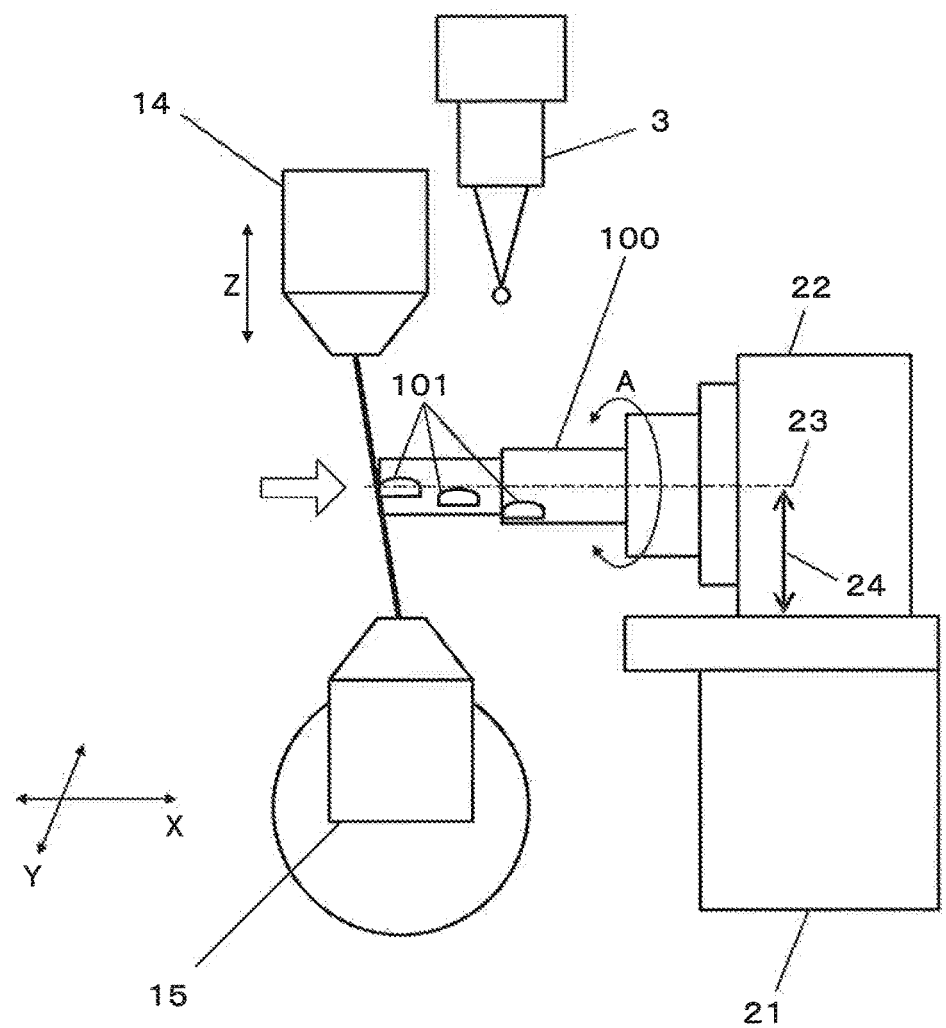
FIG. 2 is a diagram for explaining a method for machining a tool geometry using a wire electrode.

FIG. 1 is a schematic diagram for explaining a wire electric discharge machine. In addition, FIG. 2 is a schematic diagram for explaining a wire electric discharge machine that has a rotary axis that rotates a workpiece.

A wire electric discharge machine 1 includes a wire electric discharge machine main body 30 and a control device 50 that controls the wire electric discharge machine main body 30. To a wire bobbin 11, around which a wire electrode 2 is wound, a predetermined low torque that is commanded in the opposite direction of the feed-out direction of the wire electrode 2 is applied by a feed-out unit torque motor 10. The wire electrode 2 that is fed out from the wire bobbin 11 passes through a plurality of guide rollers (not shown). A brake shoe 13 that is driven by a brake motor 12 adjusts the tension of the wire electrode 2 between the brake shoe 13 and a feed roller 19 that is driven by a wire electrode feeding motor (not shown). A tension detector 20 detects the amount of tension in the wire electrode 2 running between an upper wire guide 14 and a lower wire guide 15.

The wire electrode 2 that has passed through the brake shoe 13 passes through the upper wire guide 14, the lower wire guide 15, and a lower guide roller 16. The wire electrode 2 is then sandwiched between a pinch roller 18 and the feed roller 19 that is driven by the wire electrode feeding motor (not shown), and collected in a wire electrode collection box 17.

A touch sensor 3 is attached to the upper wire guide section. The touch sensor 3 is attached so as to be capable of up/down movement in parallel with the running direction of the wire electrode 2 by an advancing/retreating function (not shown). The touch sensor 3 outputs a signal for detecting contact when contact is made with a measurement subject. The touch sensor 3 is pulled up to a retreat position when measurement is not being performed.

As shown in FIG. 2, the wire electric discharge machine main body 30 includes a machining table 21 on which a rotary axis 22 is placed. The rotary axis 22 includes a servo motor that rotates a tool main body 100 on which PCD tips 101 of a cutting tool are fixed. The cutting tool is the object to be machined, or in other words, the workpiece. The rotary axis 22 is attached to the machining table 21 so that a rotary axis center line 23 is in the horizontal direction. The object to be machined is detachably attached to the rotary axis 22 attached to the machining table 21 so as to be capable of rotating around an A axis in a manner similar to the rotation when the cutting tool performs cutting. After machining is completed, the object to be machined is removed from the rotary axis 22. The wire electric discharge machine main body 30 is capable of moving the object to be machined in mutually perpendicular X- and Y-axis directions, in relation to the wire electrode 2 that is stretched between the upper wire guide 14 and the lower wire guide 15. As a result, vertical machining of the object to be machined can be performed.

The object to be machined is a cutting tool in which an ultra-hard material, such as polycrystalline diamond (PCD) or polycrystalline cubic boron nitride (PCBN), is attached to the tool main body 100 as a cutting blade.

The upper wire guide 14 includes a Z-axis drive mechanism (not shown) that enables movement in a Z-axis direction that is perpendicular to the plane formed by the X axis and the Y axis.

When a measurement area of the object to be machined is measured using the touch sensor 3, the touch sensor 3 can be lowered to position a probe tip of the touch sensor 3 at a predetermined position.

In addition, the positions of the upper wire guide 14 on the X axis, the Y axis, and the Z axis can be made adjustable by the upper wire guide 14 including a U-axis drive mechanism and a V-axis drive mechanism (not shown). As a result of these mechanisms being included, tapered machining of the cutting tool, which is the object to be machined, can be performed.

The control device 50 provides a function for measuring the position of a surface to serve as the rake face of the ultra-hard material that is to be machined as the cutting blade of the cutting tool using the touch sensor 3, in accordance with a measurement program. As described hereafter, the measurement program is created by the control device 50 using a machining program for machining the ultra-hard material of the cutting tool into a cutting blade by electric discharge machining. The control device 50 also provides a function for regenerating the machining program based on information obtained through measurement, and performing electric discharge machining on the ultra-hard material of the cutting tool in accordance with the regenerated machining program.

Figure 3:
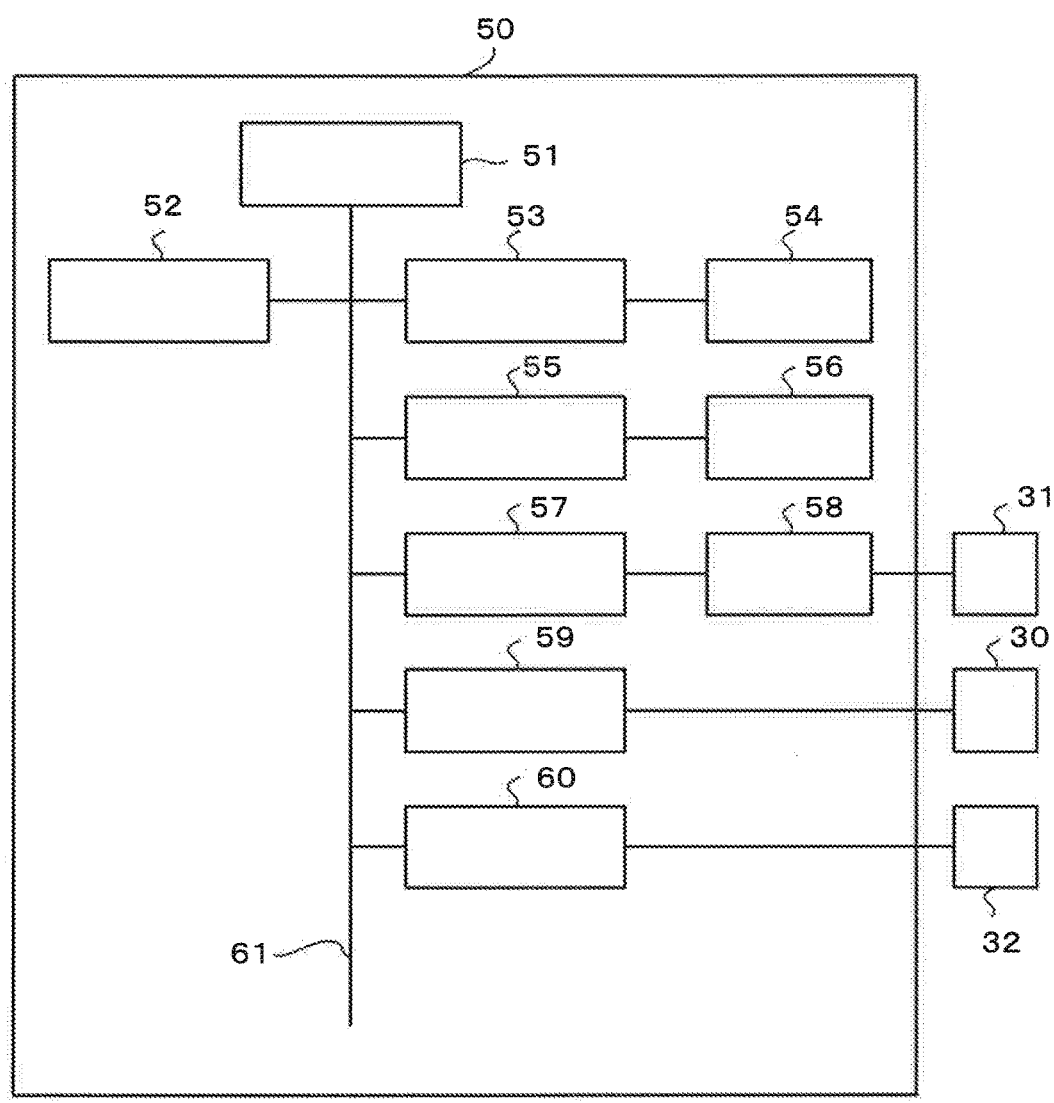
FIG. 3 is a schematic diagram for explaining a control device that controls a wire electric discharge machine main body.

The wire electric discharge machine main body 30 is controlled by the control device 50 shown in FIG. 3 and performs machining of a workpiece. The control device 50 is composed of a processor (CPU) 51, a memory 52 such as a RAM or a ROM, a display interface 53, a display device 54, a keyboard interface 55, a keyboard 56, a servo interface 57, a servo amplifier 58, and an input/output interface 60 that exchanges signals with an external device 32. The foregoing elements are connected to one another by a bus 61.

Reference numeral 30 denotes the wire electric discharge machine main body and also includes a machining power source. A servo motor 31 is driven by the servo amplifier 58. The servo motor 31 refers to servo motors corresponding to drive axes which are the X axis, the Y axis, and the A axis. The number of servo motors amounts to the number of required drive axes. Each servo motor 31 that is provided for an axis includes a position detecting device (not shown) that detects position. Position detection signals detected by the respective position detecting devices attached to the servo motors 31 are fed back to the control device 50.

The wire electric discharge machine main body 30 including the machining power source is controlled via an interface 59. When the machining program is started, a command for turning ON the machining power source is given via the interface 59. The wire electric discharge machine main body 30 is also given a command to turn OFF the machining power source via the interface 59. An external device 32 receives and transmits input and output signals via the input/output interface 60.

Next, a method for correcting rotational run-out in the rotary axis or rotational run-out in a rotation tool fixed to the rotary axis is described. Regarding measurement of the rotational run-out in the rotary axis or the rotational run-out in the rotation tool fixed to the rotary axis, there is an example in which a reference jig that is fixed to the rotary axis is used and an example in which the rotation tool that is fixed to the rotary axis is used.

[1]

The outer circumferential surface of the reference jig fixed to the rotary axis or the highly accurate outer circumferential surface of the rotation tool fixed to the rotary axis in a section near the cutting blade is measured by a touch sensor, a non-contact position detecting device, or a contact detection function provided by the wire electrode included in the wire electric discharge machine.

[2]

The measurement area on the outer circumferential surface is, for example, a back side surface at the tool center height. The rotation position of the rotary axis is changed at least twice. Measurement is performed in a total of three areas: a first area P1, then an area P2 after the rotary axis is rotated by θ°, and then an area P3 after the rotary axis is further rotated by θ°. Based on the respective measurement results, the actual rotation center position of the rotary axis and a maximum rotational run-out amount at the rotation position are calculated and stored.

The calculation method is described hereafter.

When the rake face of the blade section of the rotation tool is measured by the touch sensor, and when the rake face of the blade section of the rotation tool is measured by the touch sensor and the machining program is created, the measurement positions and machining positions are corrected taking into consideration the rotational run-out in the tool. As a result, the operation for adjusting the position of the tool can be omitted, and a high-precision rotation tool that has low rotational run-out can be created.

When a highly accurate outer circumferential surface is not present near the cutting blade of the rotation tool, a detachable collet holder can be used. A high-precision reference jig that has a similar outer diameter and length to the rotation tool can be attached to the collet holder, and rotational run-out can be measured at an interval of an arbitrary angle by the touch sensor or the wire electrode. As a result, the rotational run-out in the detachable collet holder in relation to the rotary axis can be corrected.

Here, an embodiment in which a reference jig is measured and an embodiment in which a tool is measured will be described.

<First Embodiment> Embodiment in Which a Reference Jig is Used

An embodiment in which a reference jig is used will be described.

[1]

When the detachable collet holder is used, a rod-shaped reference bar that serves as reference is attached to the collet in advance. The run-out of the outer circumferential surface in the reference bar is measured in a manner similar to that above. The outer circumferential surface of the reference jig fixed to the rotary axis is measured by a touch sensor, a non-contact position detecting device, or a contact detection function provided by the wire electrode included in the wire electric discharge machine.

As a result of the run-out of the outer circumferential surface in the reference bar being similarly measured, the labor of measuring the run-out amount for each tool can be saved. In addition, the rotational run-out in the rotary axis and the positional misalignment between the rotary axis center and the tool holder center at the tool attachment surface can be corrected, even in a tool of which the outer circumferential surface cannot be measured.

Because measurement is not required to be performed for each tool, the maximum misalignment amount "r" and the rotary axis coordinate in the misalignment direction can be stored as the amount of misalignment of the detachable collet holder from the rotary axis center. As a result of correction being automatically performed during the subsequent tool measurement and tool machining path creation operations, the amount of man-hours involved in measuring the misalignment amount for each tool can be saved.

[2]

The measurement area on the outer circumferential surface of the reference bar is, for example, a back side surface at the tool center height. The rotation position of the rotary axis is changed at least twice. Measurement is performed in a total of three areas: a first area P1, then an area P2 after the rotary axis is rotated by θ°, and then an area P3 after the rotary axis is further rotated by θ°. Based on the respective measurement results, the maximum rotational run-out amount is stored as the amount of misalignment of the detachable collet holder from the rotary axis center. The calculation method is described hereafter.

[3]

The maximum rotational run-out amount is corrected during positioning of the touch sensor when the blade face of the tool is actually measured.

[4]

In addition, the rotational run-out is corrected when the machining program for machining by the wire electrode is created based on the blade face measurement while operating the wire electric discharge machine.

Furthermore, the position of the wire electrode or the position of a work table is corrected in a manner similar to pitch error correction in conjunction with the rotation position coordinate of the rotary axis when calculation is performed based on the blade face measurement and the wire electrode performs positioning on a machining path that is read out from the machining program while operating the wire electric discharge machine.

[5]

In the correction method, when the blade face is measured or when the machining path is created, a correction amount calculated by correction amount ΔYn=maximum misalignment amount "r"*cos(An+misalignment amount "α") is corrected during Y-axis positioning, when the rotary axis coordinate that is positioned by the rotary axis is An.

[6]

When the reference bar is used, accuracy decreases, although slightly, compared to the method for measurement using the outer circumferential surface of the tool, because an error that occurs when the tool is fastened by the collet is not corrected. To correct this error as well, measurement on the outer circumferential surface of the tool is required to be performed for each tool, as described above.

The measurement method is described below.

As shown in FIG. 31, when the detachable collet holder is used to attach the tool to the rotary axis 22, a rod-shaped reference jig 200 that serves as reference, or in other words, the reference bar is attached to the collet in advance. As a result of measurement of the run-out of the outer circumferential surface in the reference jig 200, labor of measuring the run-out amount for each tool is saved. In addition, correction can also be performed for tools of which the outer circumferential surface cannot be measured.

Figures 4A, 4B, 4C:
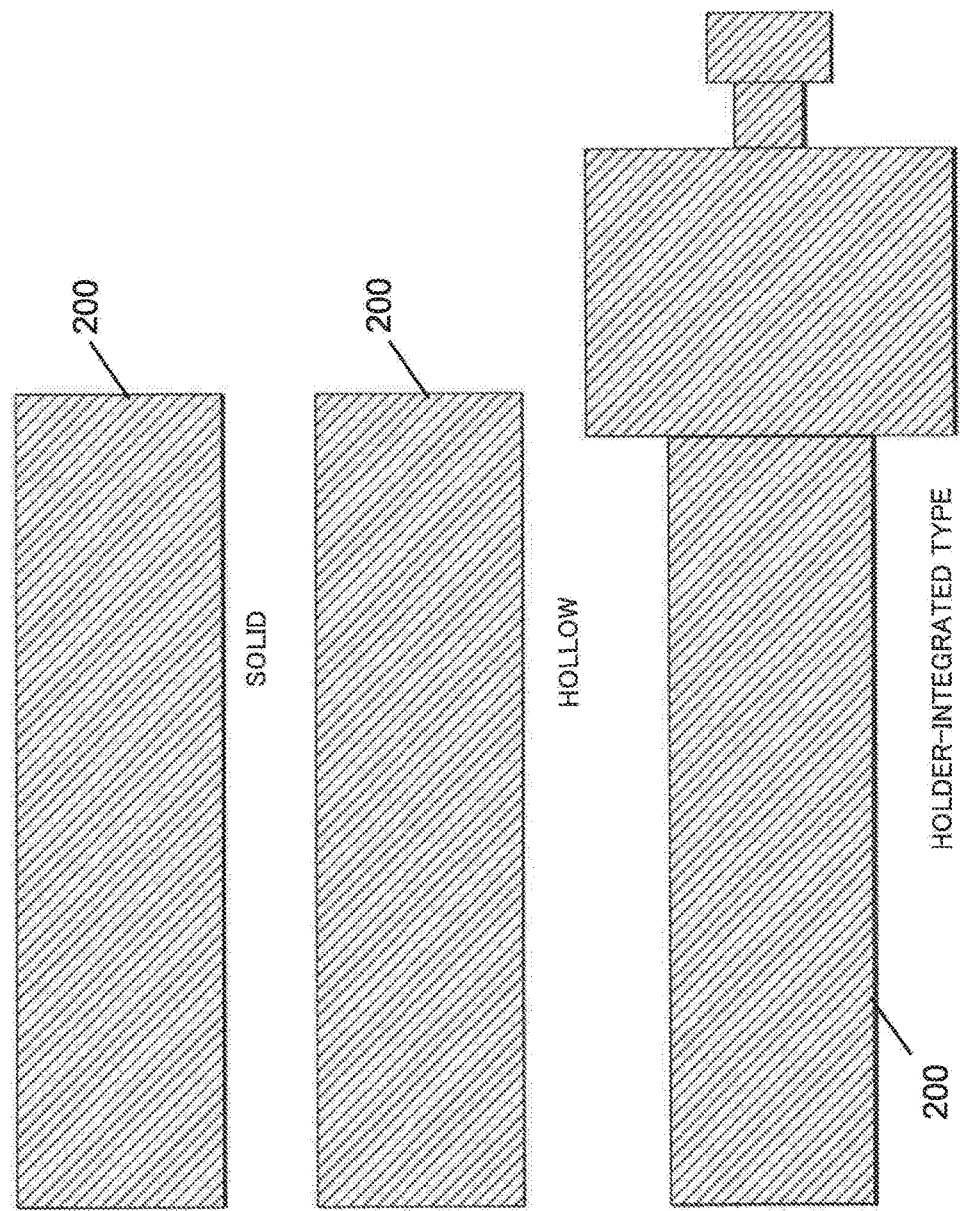
FIGS. 4A, 4B and 4C are diagrams for explaining examples of a reference jig shape.

FIGS. 4A, 4B, and 4C, and FIGS. 5A, 5B, and 5C are diagrams for explaining examples of the shape of the reference jig 200. As shown in FIGS. 4A, 4B, and 4C, the reference jig 200 is shaped into a solid or hollow rod with a diameter of 5 mm to 40 mm that is close to an ordinary machining tool diameter and a length of 30 mm to 300 mm. FIG. 4C shows the reference jig 200 in which the reference jig 200 is integrated with a fixing portion that fixes the reference jig 200 to the rotary axis.

FIG. 5A shows the solid rod-shaped reference jig 200. FIG. 5B shows the reference jig 200 that has a horizontal surface. FIG. 5C shows the reference jig 200 in which the reference jig 200 is integrated with the fixing portion that fixes the reference jig 200 to the rotary axis. The material composing the reference jig 200 is preferably a high-hardness stainless steel, such as SUS 420 J2, that does not rust even when used in the wire electric discharge machine for a long period and is not easily damaged.

Figure 7:
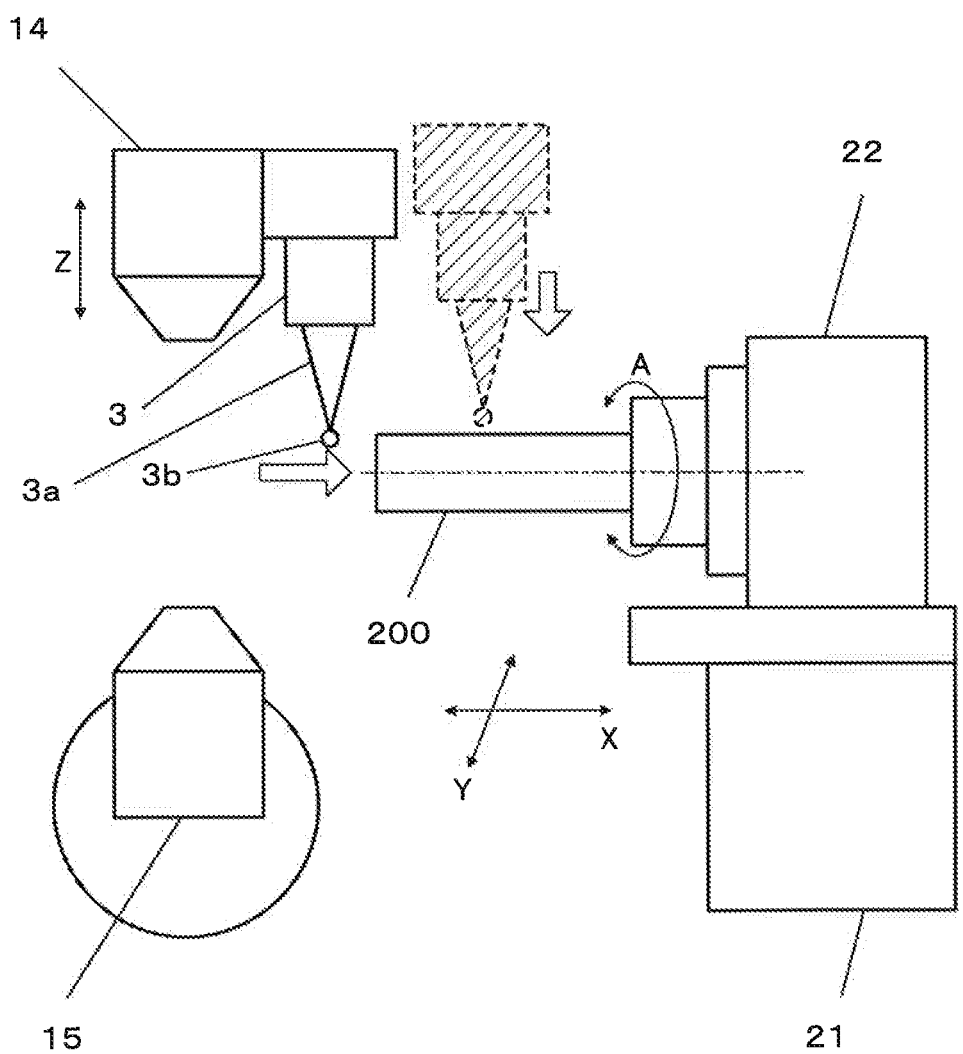
FIG. 7 is a diagram for explaining a method for measuring the reference jig using a touch sensor.

The method for measuring the reference jig 200 will be described with reference to FIG. 6 and FIG. 7. FIG. 6 is a diagram for explaining the method for measuring the reference jig 200 using the wire electrode 2. FIG. 7 is a diagram for explaining the method for measuring the reference jig 200 using the touch sensor 3. As shown in FIG. 6 and FIG. 7, the reference jig 200 is gripped by a fixing portion that is attached to the rotary axis 22 and thereby attached to the rotary axis 22. Here, the fixing portion is, for example, a tool holder such as the collet holder.

The wire electrode 2 or the touch sensor 3, a tip sphere 3b of a detector 3a in this case, is placed in contact with the outer circumferential surface of the reference jig 200 and the position is detected. To detect the position of the outer circumferential surface of the reference jig 200 with high accuracy, the surface roughness is preferably Rz 1 μm or less or Ra 0.1 μm or less, and the circularity of the outer circumferential surface is preferably 1 μm or less or the cylindricity of the outer circumferential surface is preferably 1 μm or less to enable the surface to be detected with high accuracy. This similarly applies when a non-contact detecting device is used.

When the front side or the back side of the outer circumferential side surface of the cylindrical reference bar is measured at the height of the rotary axis center by the tip sphere 3b of the detector 3a of the touch sensor 3, for example, even when the diameter of the reference bar is 20 mm and the position of the reference bar is misaligned in the upward direction as a result of a run-out of 0.1 mm, the variation in the position of the outer circumferential side surface of the reference bar is 0.5 μm between when positional misalignment occurs and when positional misalignment does not occur. Therefore, measurement may be performed with the measurement position of the touch sensor 3 remaining at the rotation center height.

The methods for measuring the reference jig 200 using the wire electrode 2 in FIGS. 6A and 6B will be described. FIG. 6A shows a method for measuring the tip position of the reference jig 200. The wire electrode 2 is moved in relation to the reference jig 200 in the X-axis direction, or in other words, in the longitudinal-axis direction of the reference jig 200. Contact of the wire electrode 2 with the tip of the reference jig 200 is detected by a conventionally known detecting unit, or a detecting unit included in the wire electric discharge machine in this case. FIG. 6B shows a method for measuring the outer diameter, or in other words, the center of the reference jig 200. The wire electrode 2 is moved in relation to the reference jig 200 in the Y-axis direction, or in other words, a direction perpendicular to the longitudinal axis of the reference jig 200. Contact of the wire electrode 2 with the outer circumferential side surface of the reference jig 200 is detected by a conventionally known detecting unit, or the detecting unit included in the wire electric discharge machine in this case.

In the measurement of the reference jig 200 by the wire electrode 2, when the front side or the back side of the outer circumferential side surface of the cylindrical reference bar is measured, even when the diameter of the reference bar is 20 mm, for example, the position of the reference bar is misaligned in the upward direction as a result of a run-out of 0.1 mm, and the position of the outer circumferential side surface of the reference bar varies, the outermost side surface can be detected at all times because the wire electrode 2 is stretched in the vertical direction.

The method for measuring the reference jig 200 using the touch sensor 3 shown in FIG. 7 will be described. The touch sensor 3 is moved in relation to the reference jig 200 in the X-axis direction, or in other words, in the longitudinal-axis direction of the reference jig 200. Contact of the touch sensor 3 with the tip of the reference jig 200 is detected. As a result, the tip position of the reference jig 200 can be measured. The touch sensor 3 is moved in relation to the reference jig 200 in the Z-axis direction, or in other words, a direction perpendicular to the longitudinal axis of the reference jig 200. Contact of the touch sensor 3 with the outer circumferential side surface of the reference jig 200 is detected. As a result, the outer diameter or the center of the reference jig 200 can be measured.

FIGS. 8A and 8B are diagrams for explaining a method for measuring a horizontal surface of the reference jig 200 using the touch sensor. The touch sensor 3 is lowered and detects the position of the horizontal surface provided in the reference jig 200. After the relative position of the touch sensor 3 to the machining table in the Y-axis direction is changed, a differing position on a single horizontal plane is detected. If the height detected at the second measurement is the same, the horizontal plane provided in the reference jig 200 is in a horizontal state.

Figure 9B:
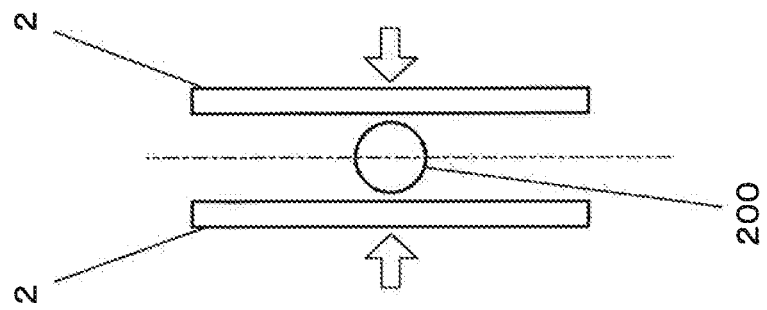
FIGS. 9A and 9B are diagrams for explaining the principle of reference jig measurement by the wire electrode.
Figure 9A:
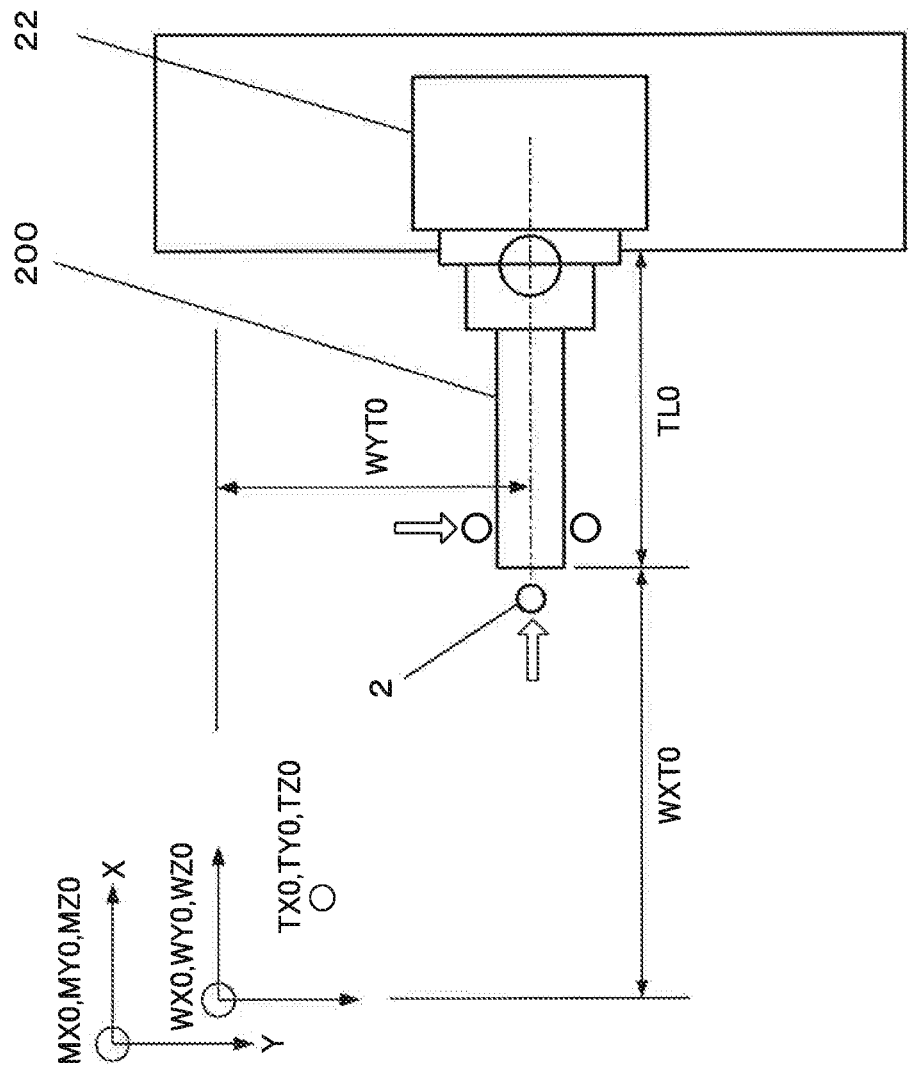

FIGS. 9A and 9B are diagrams for explaining the principle of measurement of the reference jig 200 by the wire electrode 2. The wire electrode 2 is moved in relation to the reference jig 200, from the longitudinal-axis direction of the reference jig 200. The wire electrode 2 is then placed in contact with the reference jig 200. As a result, the reference jig length of the reference jig 200 can be measured. The wire electrode 2 is moved in relation to the reference jig 200, from two directions opposing the side surface of the reference jig 200. The wire electrode 2 is then placed in contact with the reference jig 200.

FIGS. 10A and 10B are diagrams for explaining the principle of measurement of the reference jig 200 by the touch sensor 3. The touch sensor 3 is moved in relation to the reference jig 200, from the longitudinal direction of the reference jig 200. The touch sensor 3 is then placed in contact with the reference jig 200. As a result, the reference jig length of the reference jig 200 can be measured. The touch sensor 3 is moved in relation to the reference jig 200, from two directions opposing the side surface of the reference jig 200. The touch sensor 3 is then placed in contact with the reference jig 200.

The measurement area on the outer circumferential surface of the reference jig 200 is, for example, a back side surface at the height of the center of the reference jig 200. Measurement is performed a total of eight times with the rotation position of the rotary axis 22 set at 45-degree intervals. Based on the respective measurement results, the actual rotation center position of the rotary axis 22 and the maximum rotational run-out amount at the rotation position are calculated and stored.

The rotational run-out amount is corrected during positioning of the touch sensor when the blade face of the tool is actually measured. In addition, the rotational run-out amount is corrected when calculation is performed based on the blade face measurement and the machining program path for machining by the wire electrode is created.

Figure 11:
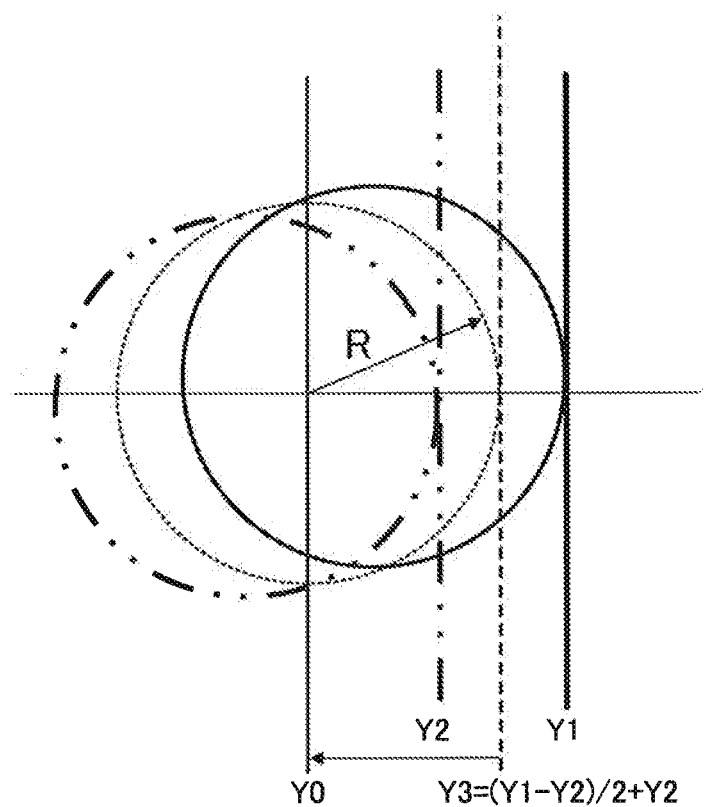
FIG. 11 is a diagram for explaining a method for determining a rotation center position Y0.

FIG. 11 is a diagram for explaining a method for detecting a rotation center position Y0. In the correction method, for example, when the back side surface at the height of the center of the reference jig 200 is measured, a rotary axis coordinate (A1) and a run-out amount (Y1) at a position in which the positional misalignment of the outer circumferential surface towards the front side (referred to, hereinafter, as a "−Y side") caused by rotational run-out is maximum, a rotary axis coordinate (A2) and a run-out amount (Y2) at a position in which the positional misalignment of the outer circumferential surface towards the back side (referred to, hereinafter, as a "+Y side") caused by run-out is maximum, and a rotary axis coordinate (A0) and a rotation center (Y0) calculated from the rotary axis coordinates (A1) and (A2) and the run-out amounts (Y1) and (Y2) are stored.

When the blade face is measured or when the machining path is created, a run-out amount (Yn) of the tool in relation to the rotary axis coordinate (An) is calculated from the stored maximum run-out amount and the rotation coordinate. The error is corrected by adjusting the path.

Based on the measured results, a rotary axis coordinate (A1) and a run-out amount (Y1) at a position in which the positional misalignment of the outer circumferential surface towards the −Y side caused by rotational run-out is minimum, a rotary axis coordinate (A2) and a run-out amount (Y2) at a position in which the positional misalignment of the outer circumferential surface towards the +Y side caused by rotational run-out is minimum, and a rotary axis coordinate (A0) and a rotation center (Y0) calculated from the rotary axis coordinates (A1) and (A2) and the run-out amounts (Y1) and (Y2) are stored.

The rotary axis coordinate and the run-out amount are stored as the amount of misalignment of the detachable collet holder from the rotary axis center. As a result of correction being automatically performed during the subsequent tool measurement and tool machining path creation operations, the amount of man-hours involved in measuring the misalignment amount for each tool can be saved.

However, accuracy is poor compared to the method for measurement using the outer circumferential surface of a tool, because an error that occurs when the tool is fastened by the collet is not corrected.

To correct this error as well, measurement on the outer circumferential surface of the tool is required to be performed for each tool.

<Second Embodiment> Embodiment in Which a Tool is Measured

[1]

A highly accurate outer circumferential surface of the rotation tool fixed to the rotary axis in a section near the cutting blade is measured by a touch sensor, a non-contact position detecting device, or a contact detection function provided by the wire electrode included in the wire electric discharge machine.

[2]

The measurement area on the outer circumferential surface is, for example, a back side surface at the tool center height. The rotation position of the rotary axis is changed at least twice. Measurement is performed in a total of three areas: a first area P1, then an area P2 after the rotary axis is rotated by θ°, and then an area P3 after the rotary axis is further rotated by θ°. Based on the respective measurement results, the actual rotation center position of the rotary axis and a maximum rotational run-out amount at the rotation position are calculated and stored.

The calculation method is described hereafter.

[3]

The maximum rotational run-out amount is corrected during positioning of the touch sensor when the blade face of the tool is actually measured.

[4]

In addition, the rotational run-out is corrected when the machining program for machining by the wire electrode is created based on the blade face measurement while operating the wire electric discharge machine.

[5]

In the correction method, when the blade face is measured or when the machining path is created, correction is performed during Y-axis positioning using a correction amount calculated by correction amount $\Delta Yn$=maximum misalignment amount "r"*cos(An+misalignment amount "α"), when the rotary axis coordinate that is positioned by the rotary axis is An.

FIGS. 12A and 12B are diagrams for explaining methods for measuring the tool fixing position using the wire electrode. FIG. 12A shows a method in which the tip position of the tool main body 100 is measured. The wire electrode 2 is moved in relation to the tool main body 100 in the X-axis direction, or in other words, the longitudinal-axis direction of the tool main body 100. Contact of the wire electrode 2 with the tip of the tool main body 100 is detected by a conventionally known detecting unit, or a detecting unit included in the wire electric discharge machine in this case. FIG. 12B shows a method for measuring the outer diameter or the center of the tool main body 100. The wire electrode 2 is moved in relation to the tool main body 100 in the Y-axis direction, or in other words, the direction perpendicular to the longitudinal axis of the tool main body 100. Contact of the wire electrode 2 with the outer circumferential side surface of the tool main body 100 is detected by a conventionally known detecting unit, or a detecting unit included in the wire electric discharge machine in this case.

Figure 13:
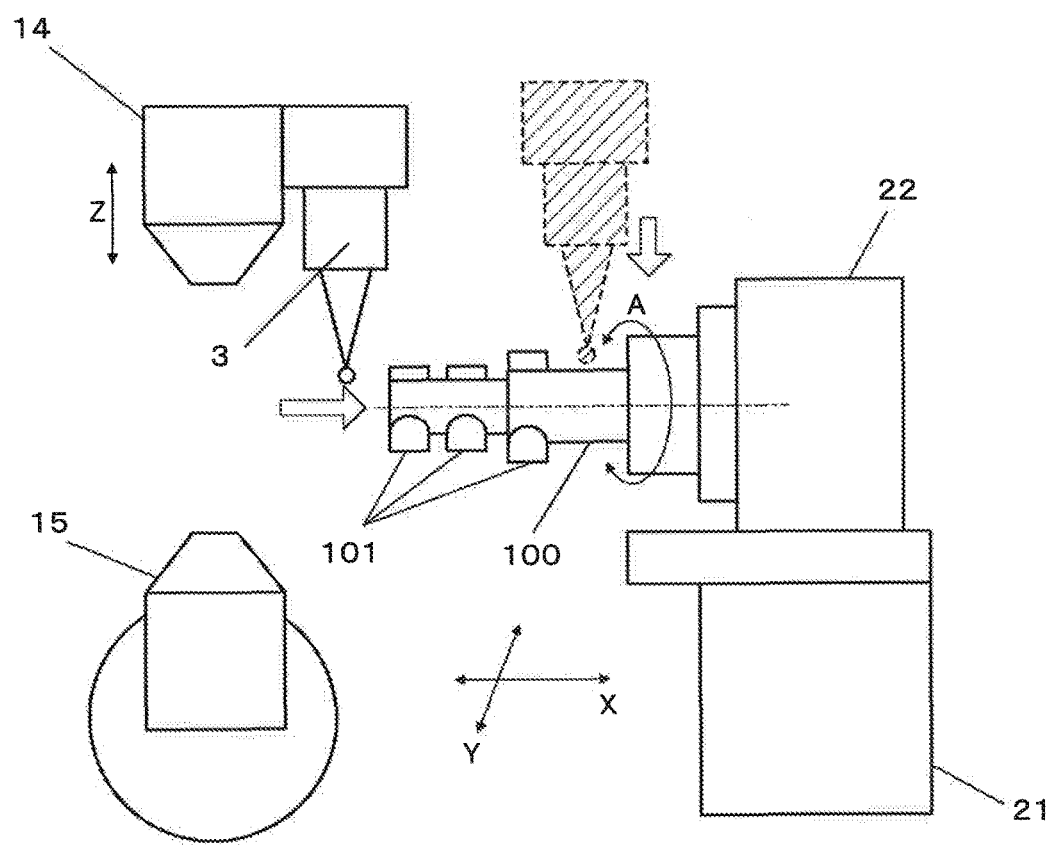
FIG. 13 is a diagram for explaining a method for measuring the tool fixing position using the touch sensor.

FIG. 13 is a diagram for explaining a method for measuring the tool fixing position using the touch sensor. The touch sensor 3 is moved in relation to the tool main body 100 in the X-axis direction, or in other words, in the longitudinal-axis direction of the tool main body 100. Contact of the touch sensor 3 with the tip of the tool main body 100 is detected. As a result, the tip position of the tool main body 100 can be measured. The touch sensor 3 is moved in relation to the tool main body 100 in the Z-axis direction, or in other words, the direction perpendicular to the longitudinal axis of the reference jig 200. Contact of the touch sensor 3 with the outer circumferential side surface of the tool main body 100 is detected. As a result, the outer diameter or the center of the tool main body 100 can be measured.

Figure 14B:
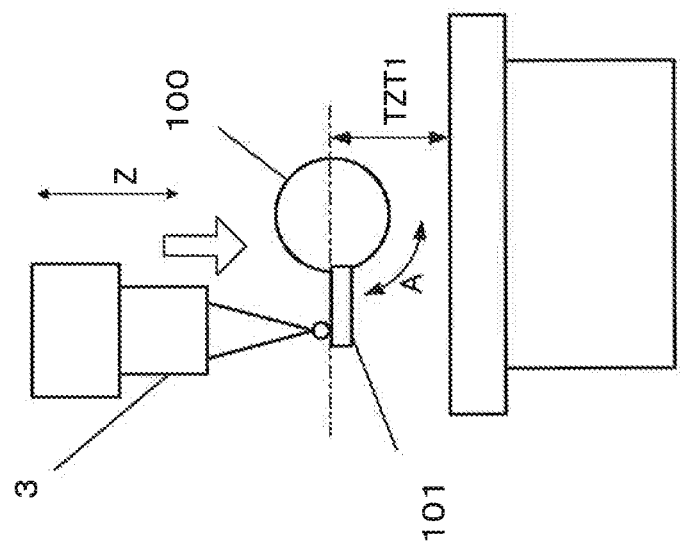
FIGS. 14A and 14B are diagrams for explaining the principle of measurement of an arbitrary tool by the touch sensor.
Figure 14A:
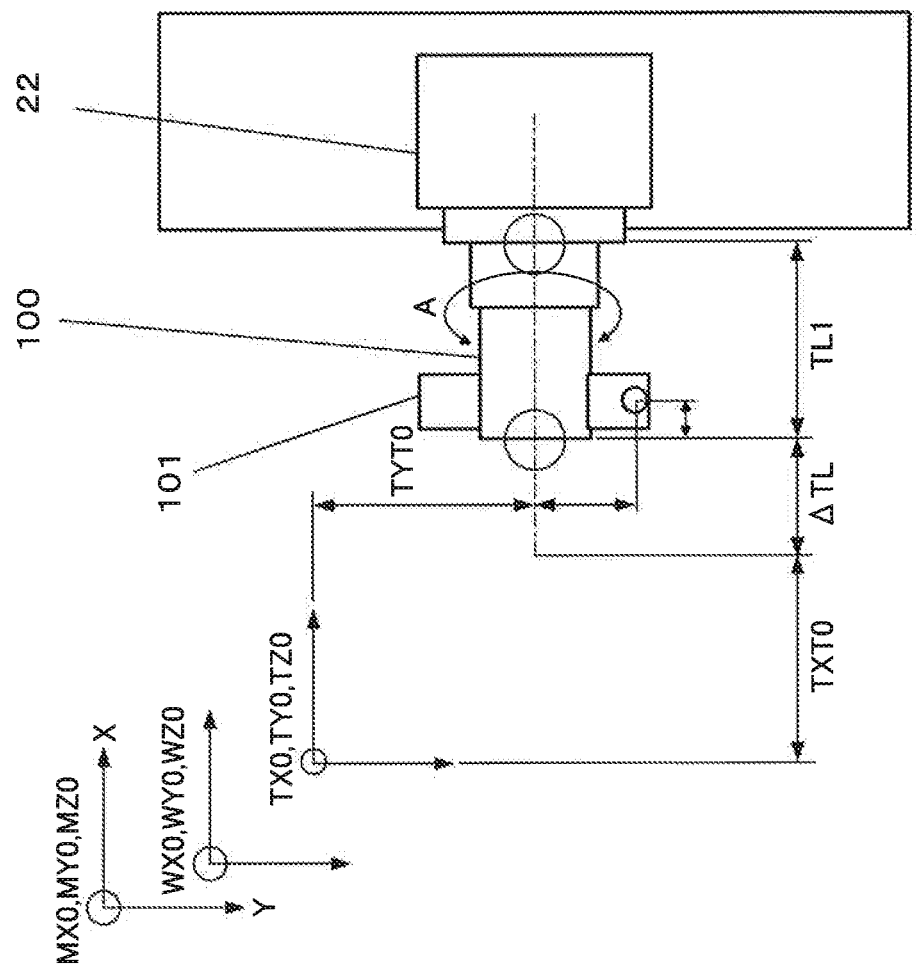

FIGS. 14A and 14B are diagrams for explaining the principle of measurement of an arbitrary tool by the touch sensor. The measurement area on the outer circumferential surface of the tool main body 100 of a PCD tool is, for example, a back side surface at the tool center height. Measurement is performed a total of eight times with the rotation position of the rotary axis set at 45-degree intervals. Based on the respective measurement results, the actual rotation center position of the rotary axis and the maximum rotational run-out amount at the rotation position are calculated and stored.

The rotational run-out amount is corrected during positioning of the touch sensor when the blade face of the tool is actually measured. In addition, the rotational run-out amount is corrected when calculation is performed based on the blade face measurement and the machining program path for machining by the wire electrode is created.

In the correction method, for example, when the back side surface at the tool center height is measured, a rotary axis coordinate (A1) and a run-out amount (Y1) at a position in which the positional misalignment of the outer circumferential surface towards the front side (referred to, hereinafter, as a "−Y side") caused by rotational run-out is maximum, a rotary axis coordinate (A2) and a run-out amount (Y2) at a position in which the positional misalignment of the outer circumferential surface towards the back side (referred to, hereinafter, as a "+Y side") caused by rotational run-out is maximum, and a rotary axis coordinate (A0) and a rotation center (Y0) calculated from the rotary axis coordinates (A1) and (A2) and the run-out amounts (Y1) and (Y2) are stored.

When the blade face is measured or when the machining path is created, a run-out amount (Yn) of the tool in relation to the rotary axis coordinate (An) is calculated from the stored maximum run-out amount and the rotation coordinate. The error is corrected on the path.

Based on the measured results, a rotary axis coordinate (A1) and a run-out amount (Y1) at a position in which the positional misalignment of the outer circumferential surface towards the −Y side caused by rotational run-out is minimum, a rotary axis coordinate (A2) and a run-out amount (Y2) at a position in which the positional misalignment of the outer circumferential surface towards the +Y side caused by run-out is minimum, and a rotary axis coordinate (A0) and a rotation center (Y0) calculated from the rotary axis coordinates (A1) and (A2) and the run-out amounts (Y1) and (Y2), are stored.

The rotary axis coordinate and the run-out amount are stored as the amount of misalignment of the detachable collet holder from the rotary axis center. As a result of correction being automatically performed during the subsequent tool measurement and tool machining path creation operations, the amount of man-hours involved in measuring the misalignment amount for each tool can be saved.

However, accuracy is poor compared to the method for measurement using the outer circumferential surface of a tool, because an error that occurs when the tool is fastened by the collet is not corrected. To correct this error as well, measurement on the outer circumferential surface of the tool is required to be performed for each tool.

When the angle of relief of a relief surface of the cutting blade is set to a large angle, it may be difficult to tilt the wire and machine the relief surface. In this case, machining is performed by the rotary axis being rotated by the angle of relief, and the relief surface and a wire electrode line that machines the relief surface being held in a vertical state. However, on the machining path in this case, a value calculated by (radius value in the program+error in the run-out amount at the rotation position in which the rotary axis is shifted by the angle of relief)×COS (angle of relief) is used as the radius value of the rotation tool towards the center of rotation.

The corrections described above can also be applied to cutting tools of which the cutting blade is composed of materials other than PCD and PCBN, in addition to cutting tools of which the cutting blade is composed of PCD and PCBN. Adjustment man-hours required to maintain the rotational run-out within the acceptable limits is not required and work hours can be significantly reduced. A high-precision rotation tool that has low rotational run-out can be easily created, even by a low-cost fixing method in which rotational run-out occurs.

Figures 15A, 15B, 15C:
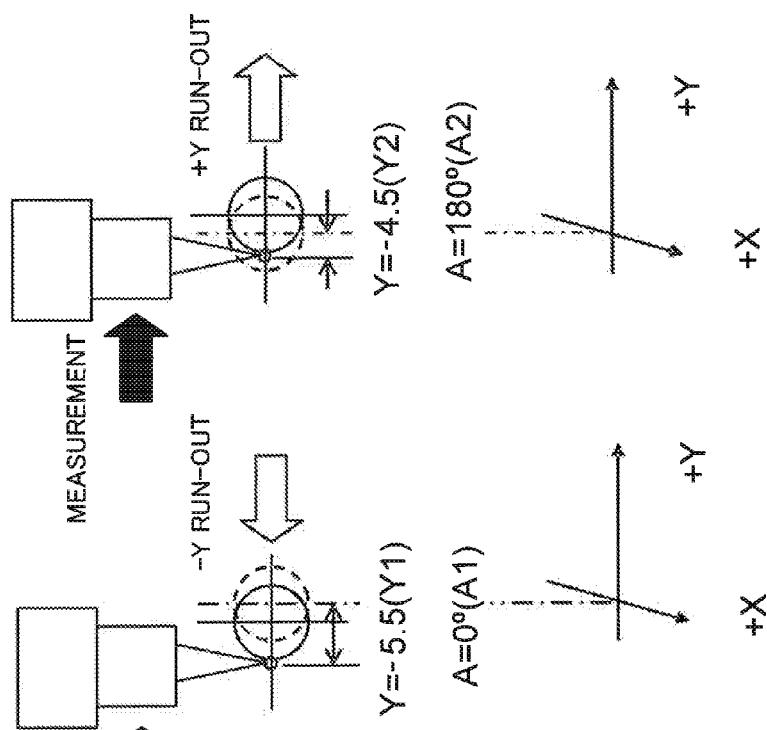
FIGS. 15A, 15B and 15C are diagrams for explaining rotational run-out.

FIGS. 15A, 15B, and 15C are diagrams for explaining a method for measuring rotational run-out. Misalignment of a tool or a reference jig in the Y-direction is measured by the rotary axis being rotated.

FIGS. 16A, 16B, and 16C are diagrams for explaining high-precision tool machining actualized by rotational run-out correction. High-precision tool machining can be performed by the rotational run-out obtained by measurement being corrected.

Figure 17C:
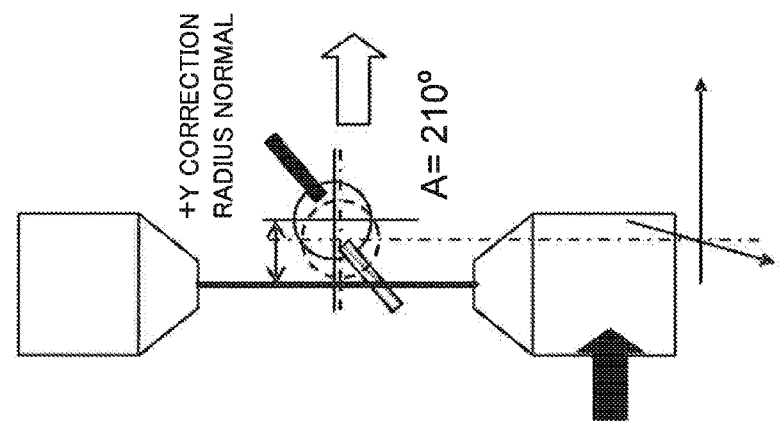
FIGS. 17A, 17B and 17C are diagrams for explaining high-precision tool machining by rotational run-out correction in relief surface machining.
Figure 17B:
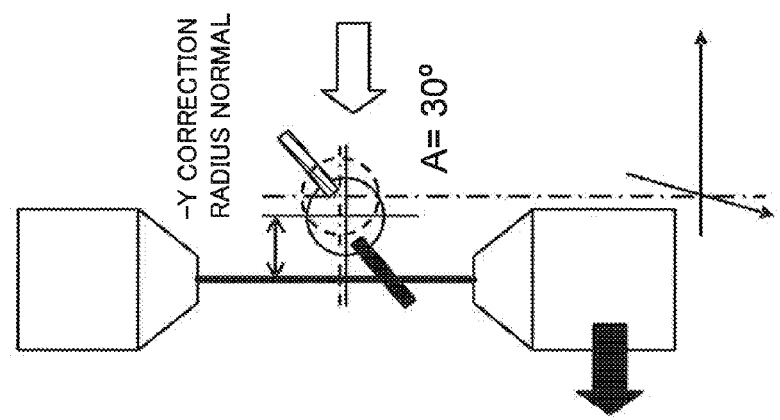
Figure 17A:
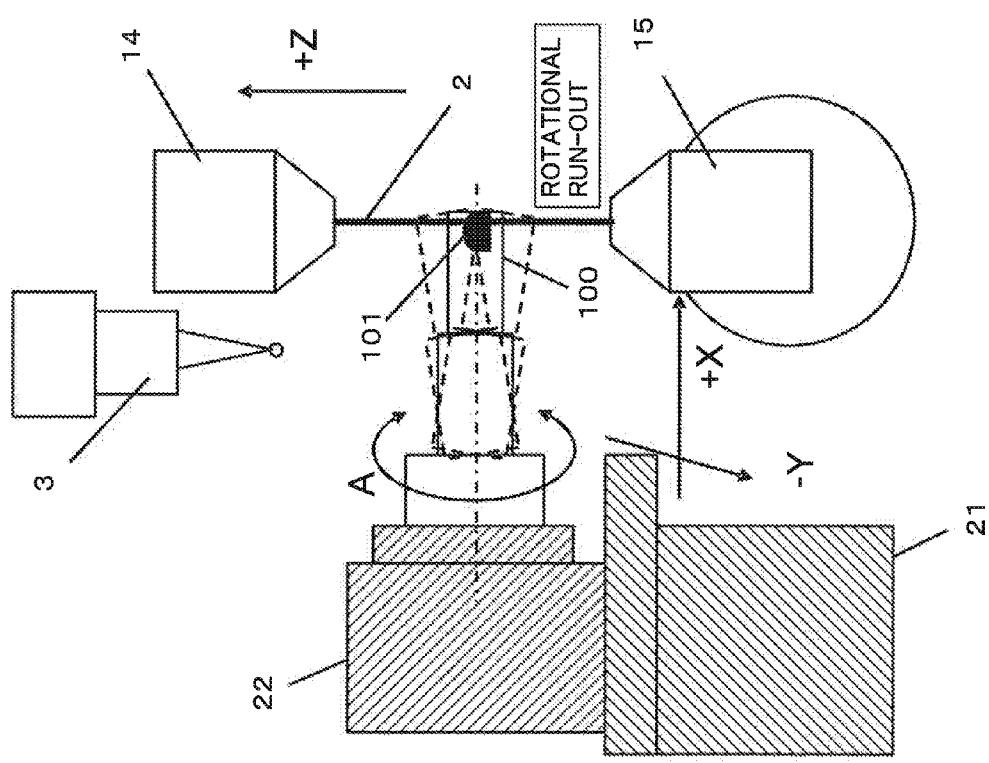

FIGS. 17A, 17B, and 17C are diagrams for explaining high-precision tool machining actualized by rotational run-out correction in relief surface machining. When the angle of relief is 30 degrees and machining is performed with the relief surface in a vertical state, the correction amount of the run-out in the Y-direction is a correction amount obtained by the rotational run-out amount at the rotary axis coordinate at a position corrected by an amount amounting to the angle of relief multiplied by cos (30°).

The methods for calculating the rotational run-out will hereinafter be described with reference to FIGS. 18 to 25.

<When measuring a tool or a reference bar that is misaligned from the center of rotation by a distance "r" and an angle "α" at the first measurement point during measurement of the outer circumference of the tool or the outer circumference of the reference bar>

Figure 18:
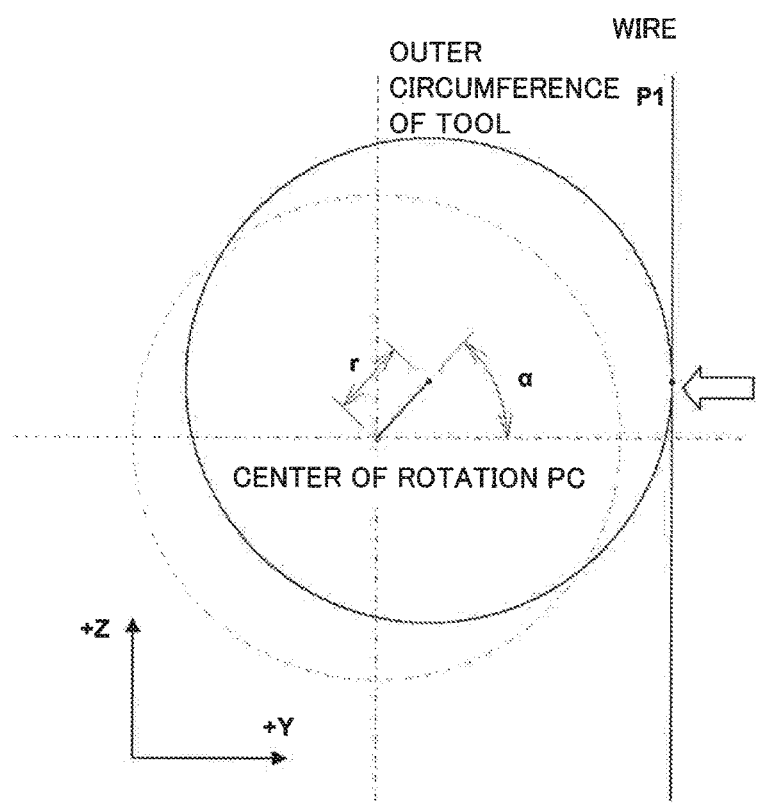
FIG. 18 is a diagram for explaining a method for calculating rotational run-out.

The rotary axis position of the first measurement point is set to A=0 degrees. The position of contact with the outer circumference is determined by the wire electrode and the measurement position P1 is measured. The coordinate of the measurement point P1 is, for example, a positional coordinate that has been moved in the −Y direction from a Y coordinate=0 of a reference point P0. FIG. 18 is a diagram of a view from the tip (+X side) of the tool attached to the rotary axis towards the fixing portion (−X side) of the rotary axis. The circular shape formed by the dashed line indicates the original outer circumference of the tool when misalignment has not occurred. The dashed lines forming a cross indicate center of rotation reference lines of the rotary axis.

Figure 19:
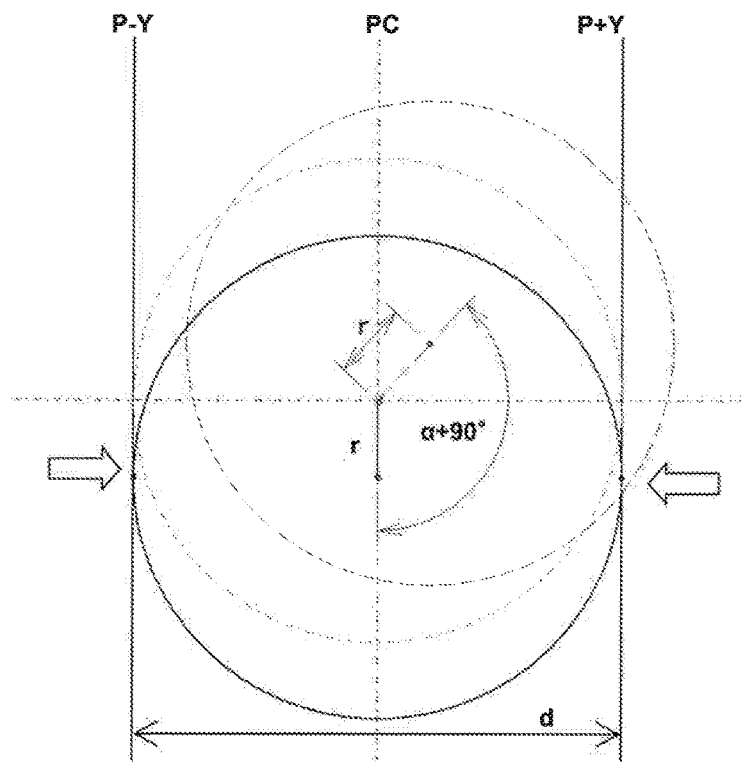
FIG. 19 is a diagram for explaining a method for calculating rotational run-out.

As shown in FIG. 19, the positional misalignment (see FIG. 18) is measured, and the misalignment amount "r" and the misalignment angle "α" are determined by calculation. The rotary axis is positioned in a rotation position that does not affect measurement by the wire electrode. As a result, the outer circumference of the tool or the outer circumference of the reference bar can be accurately measured. The center of rotation "PC" and the outer circumference diameter "d" of the tool can be determined.

Figure 20:
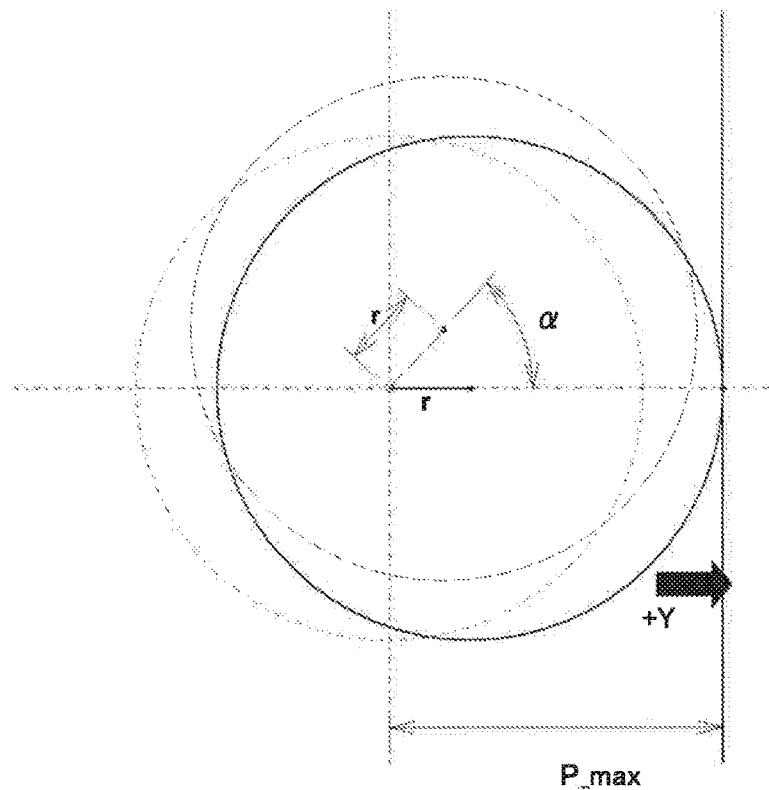
FIG. 20 is a diagram for explaining a method for calculating rotational run-out.

As shown in FIG. 20, during machining, for example, the maximum run-out amount in the +Y direction is "r" at the position in which the position of the rotary axis is rotated to the right by a degrees from the first measurement position A=0. Therefore, at this position, correction is performed in which the position of the wire electrode is shifted by "r".

Figure 21:
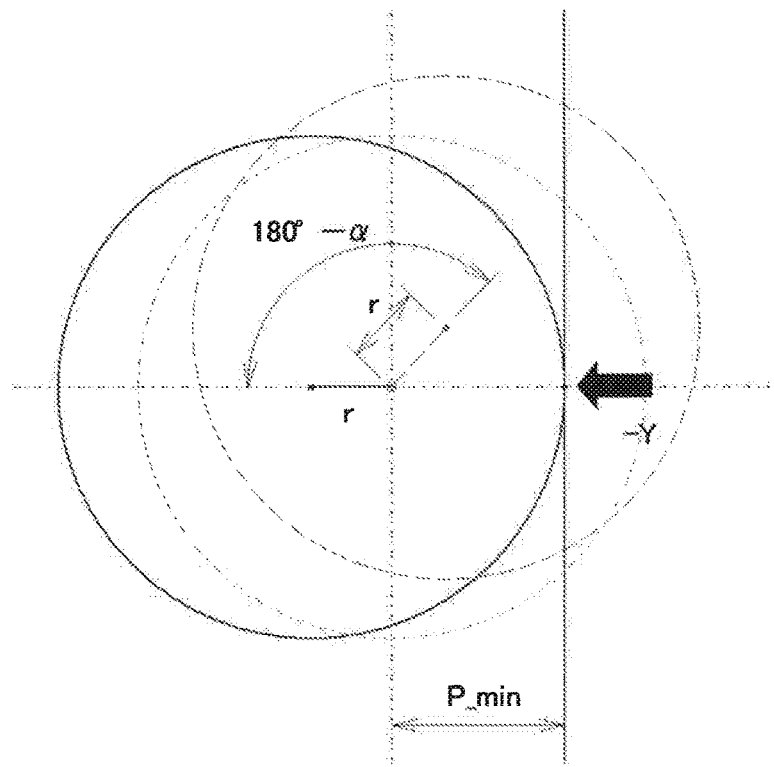
FIG. 21 is a diagram for explaining a method for calculating rotational run-out.

As shown in FIG. 21, in a similar manner, the maximum run-out amount in the −Y direction is "r" at the position in which the position of the rotary axis is rotated to the left by 180−α degrees from the first measurement position A=0. Therefore, at this position, correction is performed in which the position of the wire electrode is shifted by "r". The correction amount is calculated in conjunction with the positioning position A coordinate of the rotary axis, and the positioning position of the wire electrode is corrected. For example, the correction amount is calculated by ΔY=r×cos (A+α).

Figure 22:
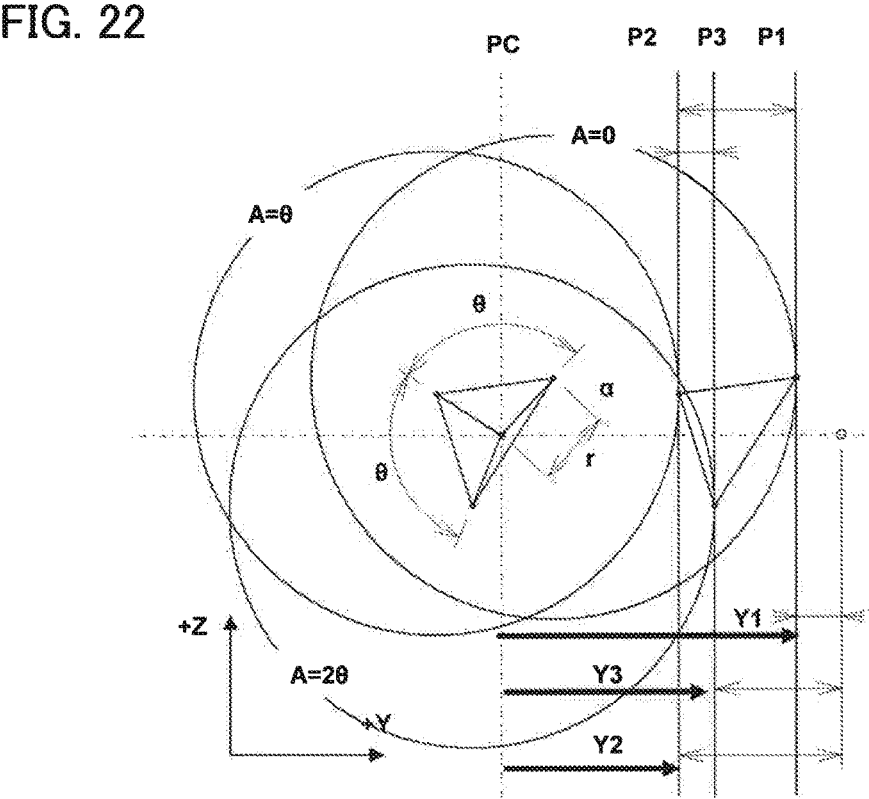
FIG. 22 is a diagram for explaining a method for calculating rotational run-out.

In FIG. 22, a method for calculating a center misalignment amount is described.

The outer circumference position of the tool is measured at the rotation coordinate positions of at least three areas: the rotary axis position A=0 during the first measurement of a point on the outer circumference of the tool, a rotary axis position A=θ during the next measurement, a rotary axis position A=2θ during the measurement thereafter. The misalignment amount "r" and the misalignment direction angle "α" are determined from the respective measurement points P1, P2, and P3, and the rotation coordinate using the following arithmetic expressions.

$$\alpha = \arctan[\sin(\theta)/(c/b - \cos(\theta))] - \theta/2$$

$$r = b/[2 \cdot \sin(\theta/2 + \alpha) \cdot \sin(\theta/2)]$$

The coordinate of each measurement point is a Y-direction coordinate and is a positive value in the right-arrow direction.

$$a = 2 \cdot r \cdot \sin(\theta/2)$$

$$b = P1 - P2, \ c = P2 - P3$$

Figure 23:
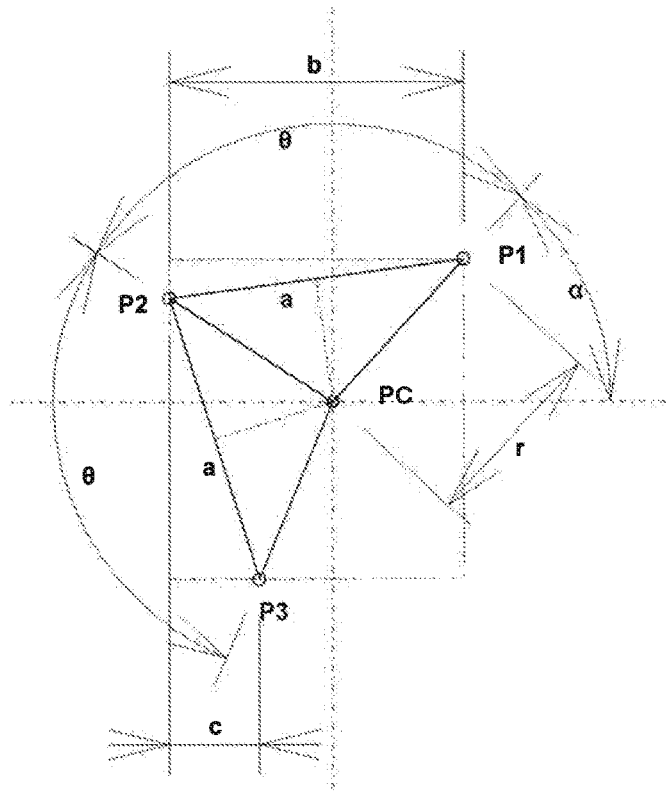
FIG. 23 is a diagram for explaining a method for calculating rotational run-out.

In FIG. 23, in a manner similar to FIG. 22, the method for calculating the center misalignment amount is described. The relative positional relationships of P1, P2, and P3 at which the outer circumference of the tool is measured by the wire electrode is the same as the positional relationships of the tool center positions at the respective positioning positions of the rotary axis. Therefore, in FIG. 23 and subsequent drawings, the rotary axis center PC, and the tool center positions P1, P2, and P3 are used in the descriptions of the calculation formulas. The position rotated by θ° from the P1 position is P2. The position further rotated by θ° is P3.

A line segment is drawn from the rotary axis center to the tool center P1 at the first measurement position P1. Line segments from PC to P2 and from PC to P3 are also similarly drawn. The distances between PC and P1, between PC and P2, and between PC and P3 are each the misalignment amount "r". Next, line segments are drawn from P1 to P2 and from P2 to P3. The distances between P1 and P2 and between P2 and P3 can be determined by a=2·r·sin(θ/2). The distance in the Y direction between P1 and P2 can be determined by b=Y1−Y2, and the distance in the Y direction between P2 and P3 can be determined by b=Y1−Y2.

Figure 24:
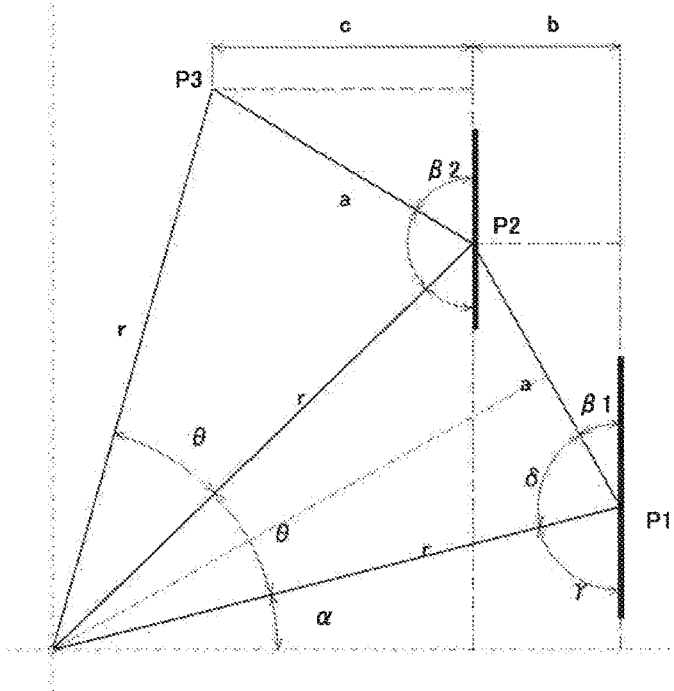
FIG. 24 is a diagram for explaining a method for calculating rotational run-out.

The calculation method when P1 to P3 are present in a first quadrant will first be described with reference to FIG. 24. When a thick vertical line at the tool center P1 during the first measurement of the point on the outer circumference of the tool and a line segment from the rotary axis center PC at a misalignment angle a are drawn, and a line segment is drawn from point P1 to point P2, based on a relationship angle β1+δ+γ=180°, β1=θ/2+α. Here, δ=(180°−θ)/2, and γ=90−α. Furthermore, as a trigonometric function, sin(β1)=b/a is established. Therefore, $$\sin(\theta/2 + \alpha) = b/(2 \cdot r \cdot \sin(\theta/2)) \quad \text{(expression 1).}$$

Next, when a thick vertical line at point P2 and a line segment from the rotary axis center PC at an angle that is the misalignment angle α+rotation angle θ are drawn, and a line segment is drawn from point P2 to point P3, in a manner similar to that above, the angle β2=3·θ/2+α. Furthermore, as a trigonometric function, sin(β2)=c/a is established. Therefore, $$\sin(3 \cdot \theta/2 + \alpha) = c/(2 \cdot r \cdot \sin(\theta/2)) \quad \text{(expression 2).}$$

The first misalignment angle "α" can be determined as follows from expression 1 and expression 2:

$$\alpha = \tan^{-1}[\sin(\theta)/(c/b - \cos(\theta))] - \theta/2$$

In addition, the misalignment amount "r" can be determined as follows:

$$r = b/[2 \cdot \sin(\theta/2 + \alpha) \cdot \sin(\theta/2)]$$

or $$r = c/[2 \cdot \sin(3 \cdot \theta/2 + \alpha) \cdot \sin(\theta/2)]$$

Figure 25:
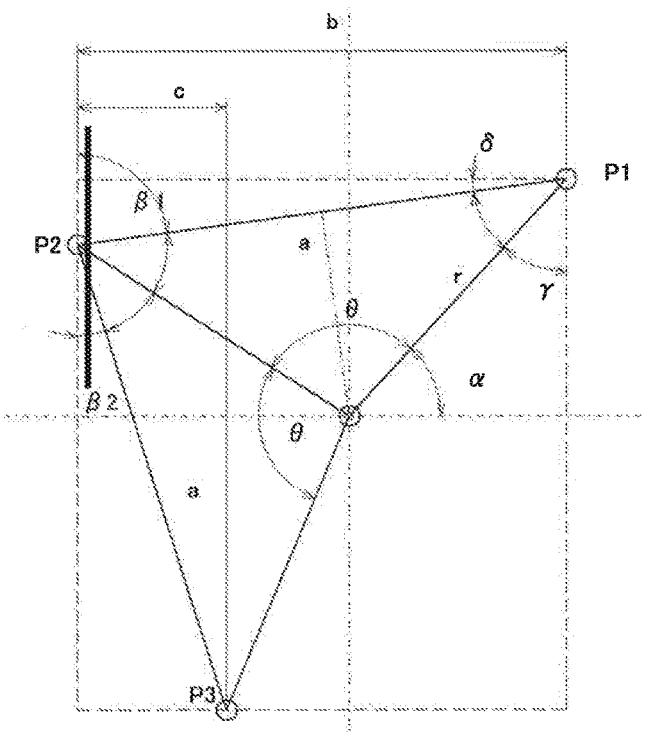
FIG. 25 is a diagram for explaining a method for calculating rotational run-out.

In FIG. 25, the calculation method when P1 is present in the first quadrant, P2 is present in a second quadrant, and P3 is present in a third quadrant is described. The relationship $\sin(\beta 1) = b/a$ based on P1 and P2 and the relationship $\sin(\beta 2) = c/a$ based on P2 and P3 are similar to those in the example above.

$$\beta 1 = 90 - \delta = 180 - (\theta/2 + \alpha)$$
$$\delta = 90 - \gamma - (180 - \theta)/2, \gamma = 90 - \alpha$$
$$\beta 2 = 180 - \beta 1 - (180 - \theta)/2 - (180 - \theta)/2 = -180 + (3 \cdot \theta/2 + \alpha)$$
$$\sin(\beta 1) = \sin(180 - (\theta/2 + \alpha)) = \sin(\theta/2 + \alpha)$$
$$\sin(\beta 2) = \sin((3 \cdot \theta/2 + \alpha) - 180 = -\sin(3 \cdot \theta/2 + \alpha)$$

The position of P3 is further towards the +Y side than P2. At this time, the value of c is a negative value. Therefore, when expression $\sin(\beta 2) = c/a$ is applied, the symbols match.

In this way, expression 1 and expression 2 are both established as calculation formulas regardless of the quadrant. Therefore, the misalignment angle "α" and the misalignment amount "r" can be correctly determined as described above.

In particular, when θ=90°, the calculation formulas can be simplified as follows and are therefore practical:

$$\alpha = \tan^{-1}(c/b) - \theta/2$$

$$r = b/(\sin(\alpha) + \cos(\alpha))$$

or $$r = c/(\cos(\alpha) - \sin(\alpha))$$

Figures 26A, 26B:
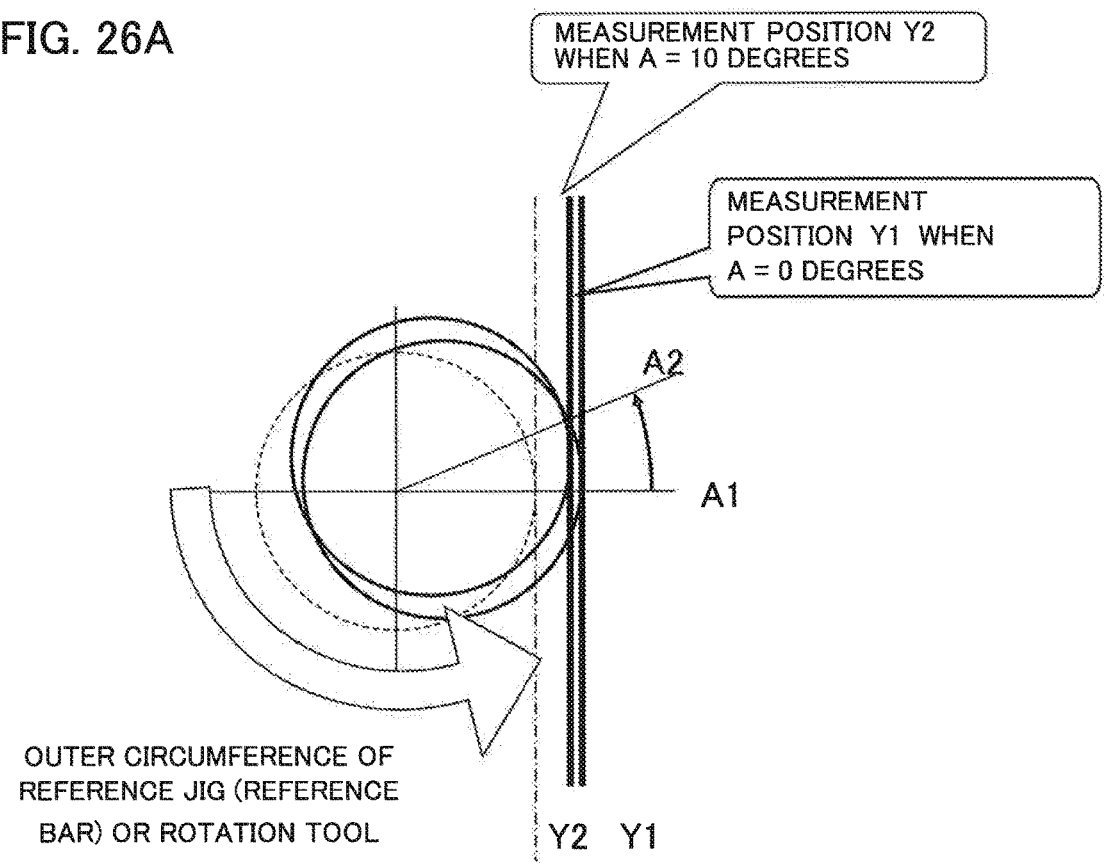
FIGS. 26A and 26B are diagrams for explaining a method for determining rotational run-out.

FIGS. 26A and 26B are diagrams for explaining a method for determining rotational run-out.

The outer circumferential surface is measured at the position in which the rotary axis coordinate A1=0 degrees. The error in relation to the outer circumferential surface coordinate when no run-out has occurred is Y1. The measurement is similarly performed every time the rotary axis is rotated by ten degrees. The respective rotation coordinates A1 to A35 and the measured error amounts Y1 to Y35 are stored. Based on the stored error amounts, correction is performed using the error amount stored for the angle A corresponding to the angle A for which a command is given during machining. Because the measurement interval is an angle of ten degrees, when a command is given for an intermediate angle, distributed interpolation of the angle and the error amount can be performed. Alternatively, the same error amount may be used within a range of ±5 degrees. When the rotation angle is ten degrees, the difference in error amount is small and interpolation may be considered unnecessary.

Figure 27B:
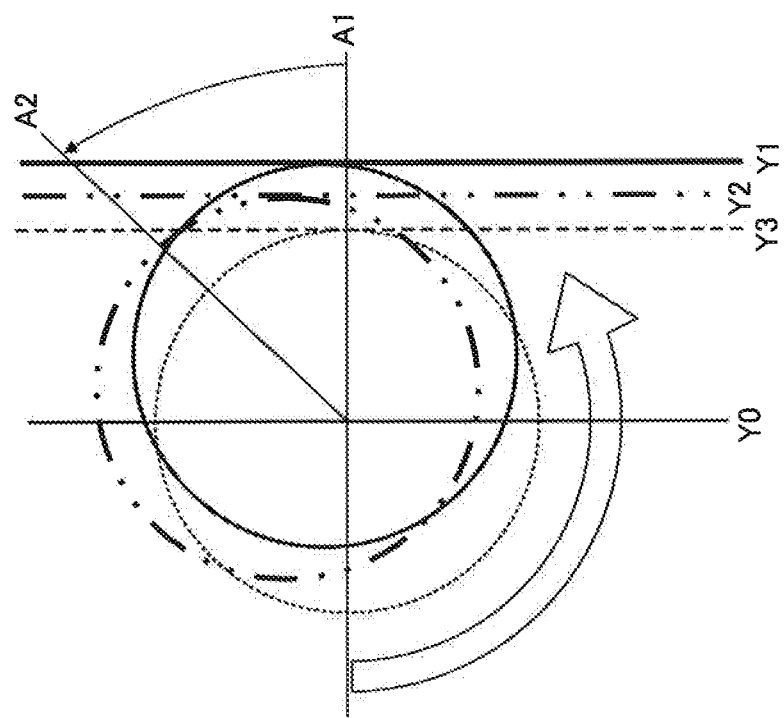
FIGS. 27A and 27B are diagrams for explaining another method for determining rotational run-out.
Figure 27A:
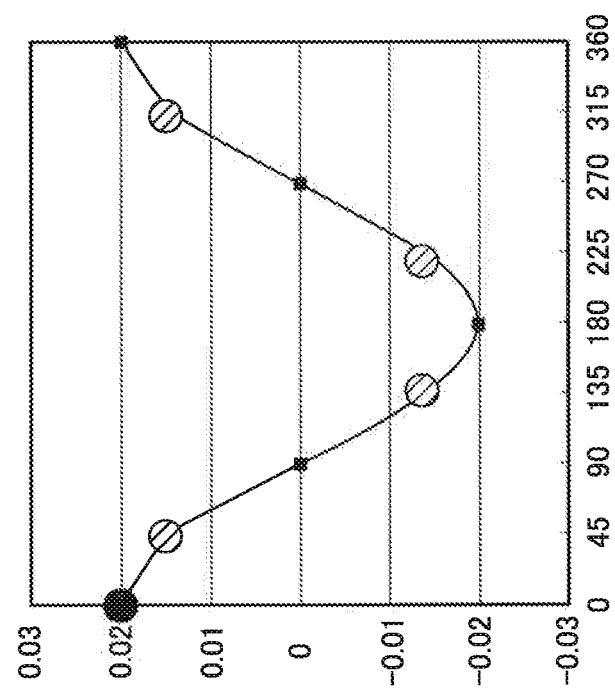
Figure 28B:
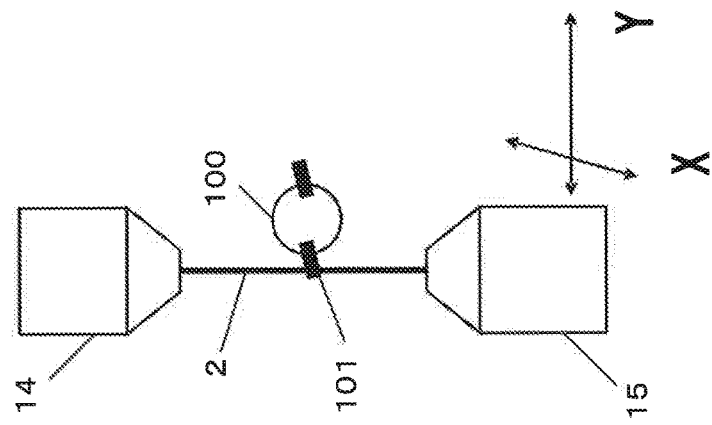
FIGS. 28A and 28B are diagrams for explaining a method for machining a tool using the wire electrode.
Figure 28A:
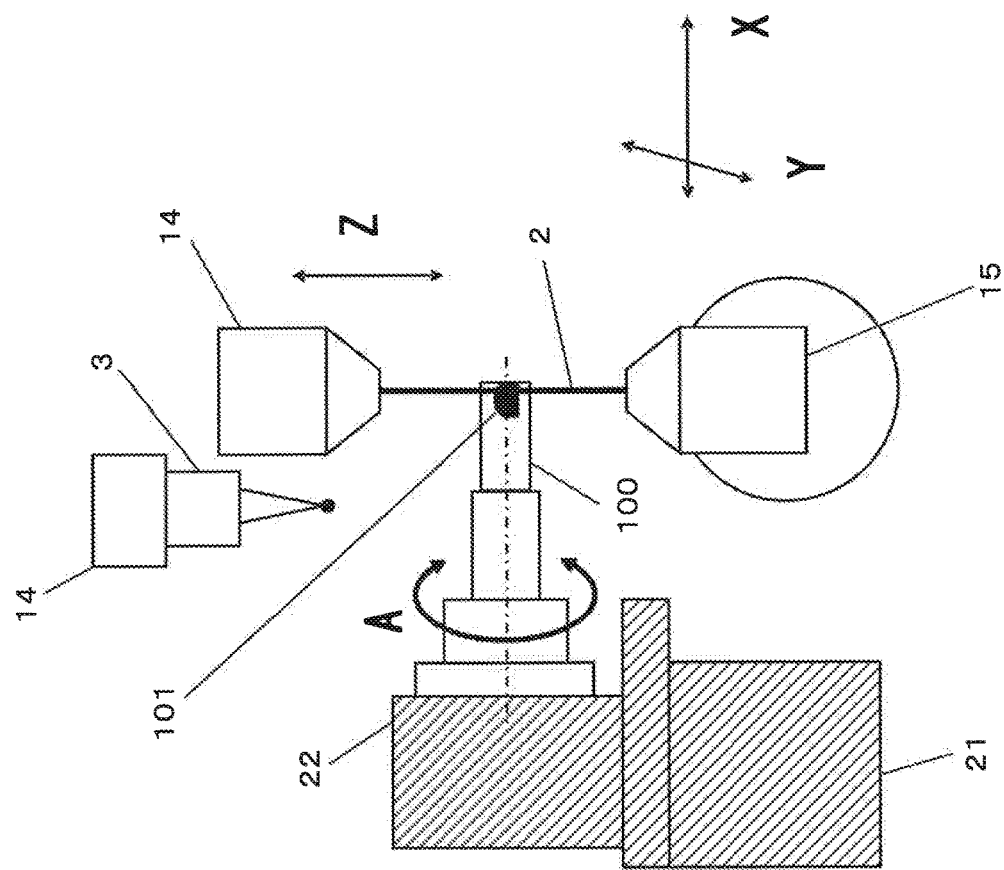
Figure 30:
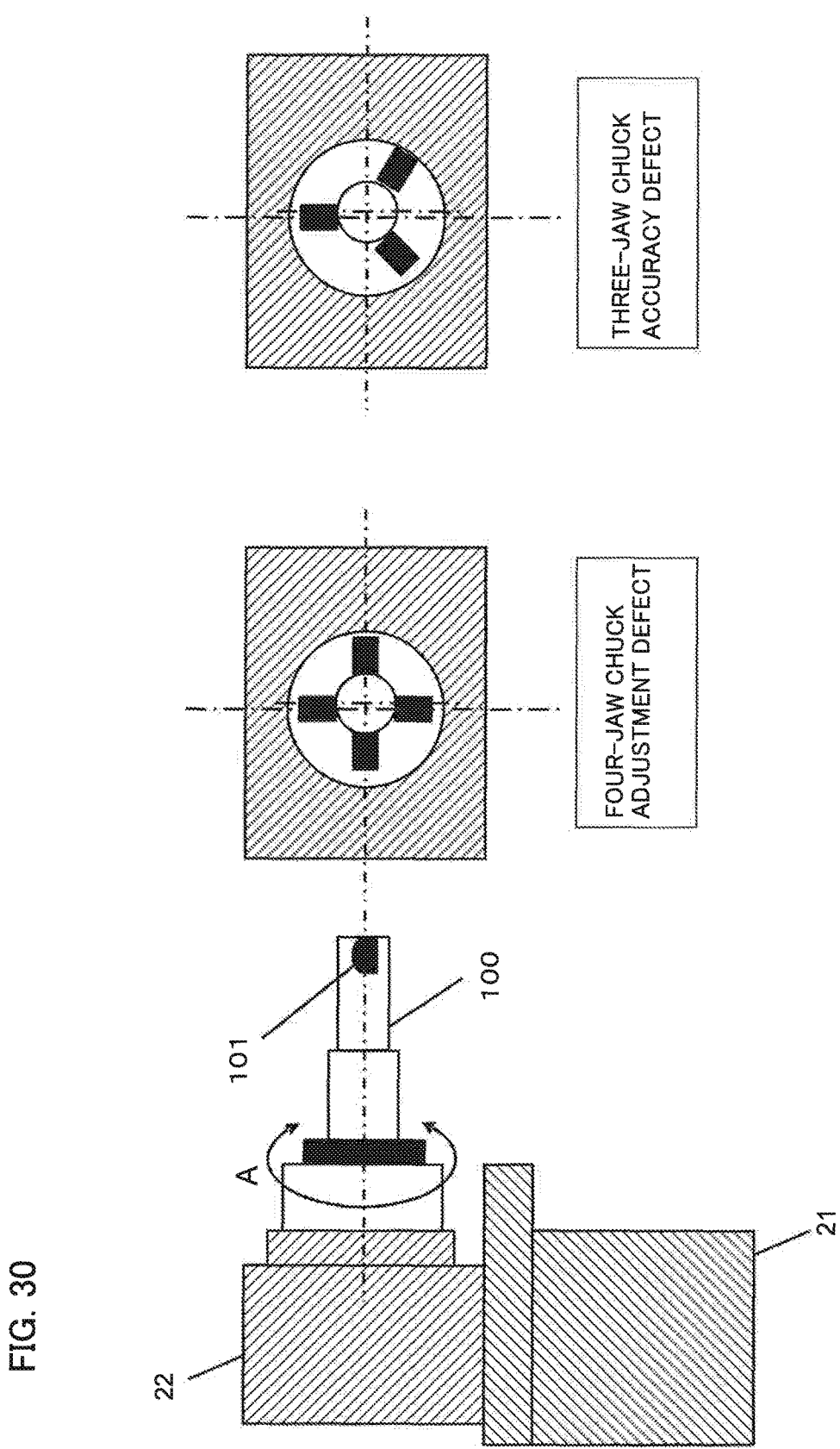
FIG. 30 is a diagram for explaining positional misalignment between the center of rotation of a rotary axis and the center of a tool.

FIGS. 27A and 27B are diagrams for explaining another method for determining rotational run-out. When the rotational run-out is measured at only four areas, measurement is performed at 45 degrees, 135 degrees, 225 degrees, and 315 degrees. Cosine curve fitting that passes through the four points is performed, and the error amount at an arbitrary angle can be calculated.

The invention claimed is:

1. A cutting tool machining method including measuring a position of a blade face in a cutting tool attached to a rotary axis by a touch sensor or a non-contact position detecting device, for creating a machining program based on the measured position, and for machining a blade section of the cutting tool by wire electric discharge, the cutting tool machining method comprising:

fixing a rod-shaped reference bar to the rotary axis;
performing rotation positioning in at least three rotation angle positions by the rotary axis;
measuring a position in an outer circumferential section near a rotation center height in a direction approaching an outer circumferential surface of the reference bar for measurement at each rotation angle position by the touch sensor, the non-contact position detecting device, or a wire electrode;
storing the measured positions in a storage unit as rotational run-out position information for the rotation angle positions;
calculating a center coordinate of rotational run-out, and a rotation coordinate and a run-out error of each rotation angle position based on the stored rotational run-out position information; and
correcting the machining program or a machining path to cancel the rotational run-out error determined by the calculation, when the cutting tool is fixed to the rotary axis and machined,
wherein the method further comprises detecting an upper end surface position of the outer circumferential section from an upper position of the reference bar at the center of rotation in a direction approaching the outer circumferential section towards the lower side, instead of the position in the outer circumferential section near the rotation center height, when the outer circumferential section of the reference bar is measured by the touch sensor or the non-contact position detecting device.

2. A wire electric discharge machine for measuring a position of a blade face in a cutting tool attached to a rotary axis by a touch sensor or a non-contact position detecting device, for creating a machining program based on the measured position, and for machining a blade section of the cutting tool, the wire electric discharge machine comprising:

a controller configured to
store, as rotational run-out position information for at least three rotation angle positions, positions in an outer circumferential section near a rotation center height, measured in a direction approaching an outer circumferential surface of a rod-shaped reference bar for measurement at each rotation angle position by the touch sensor, the non-contact position detecting device, or a wire electrode, in a state where the reference bar is fixed to the rotary axis,
calculate a center coordinate of rotational run-out, and a rotation coordinate and a run-out error of each rotation angle position based on the stored rotational run-out position information, and correct the machining program or a machining path to cancel the rotational run-out error determined by the calculation when the cutting tool is fixed to the rotary axis and machined, wherein the controller is further configured to detect an upper end surface position of the outer circumferential section from an upper position of the reference bar at the center of rotation in a direction approaching the outer circumferential section towards the lower side, instead of the position in the outer circumferential section near the rotation center height, when the outer circumferential section of the reference bar is measured by the touch sensor or the non-contact position detecting device.

3. A cutting tool machining method including measuring a position of a blade face in a cutting tool attached to a rotary axis by a touch sensor or a non-contact position detecting device, creating a machining program based on the measured position, and machining a blade section of the cutting tool by wire electric discharge, the cutting tool machining method comprising:

fixing the cutting tool to the rotary axis;

performing rotation positioning in at least three rotation angle positions by the rotary axis;

measuring a position in an outer circumferential section near a rotation center height in a direction approaching a cylindrical outer circumferential section of the cutting tool for measurement at each rotation angle position by the touch sensor, the non-contact position detecting device, or a wire electrode;

storing the measured positions in a storage unit as rotational run-out position information;

calculating a center coordinate of rotational run-out, and a rotation coordinate and a run-out error of each rotation angle position, based on the stored rotational run-out position information; and correcting the machining program or a machining path to cancel the rotational run-out error determined by the calculation, when the cutting tool is machined, wherein the method further comprises detecting an upper end surface position of the outer circumferential section from an upper position of the cutting tool at the center of rotation in a direction approaching the outer circumferential section towards the lower side, instead of the position in the outer circumferential section near the rotation center height, when the cylindrical outer circumferential section of the cutting tool is measured by the touch sensor or the non-contact position detecting device.

4. A wire electric discharge machine for measuring a position of a blade face in a cutting tool attached to a rotary axis by a touch sensor or a non-contact position detecting device, for creating a machining program based on the measured position, and for machining a blade section of the cutting tool, the wire electric discharge machine comprising:

a controller configured to store, as rotational run-out position information for at least three rotation angle positions, positions in an outer circumferential section near a rotation center height measured in a direction approaching a cylindrical outer circumferential section of the cutting tool for measurement at each rotation angle position by the touch sensor, the non-contact position detecting device, or a wire electrode, in a state where the cutting tool is fixed to the rotary axis, calculate a center coordinate of rotational run-out, and a rotation coordinate and a run-out error of each rotation angle position based on the stored run-out position information, and correct the machining program or a machining path to cancel the rotational run-out error determined by the calculation when the cutting tool is machined, wherein the controller is further configured to detect an upper end surface position of the outer circumferential section from an upper position of the cutting tool at the center of rotation in a direction approaching the outer circumferential section towards the lower side, instead of the position in the outer circumferential section near the rotation center height, when the cylindrical outer circumferential section of the cutting tool is measured by the touch sensor or the non-contact position detecting device.

* * * * *